United States Patent
Le et al.

(10) Patent No.: US 12,399,588 B2
(45) Date of Patent: Aug. 26, 2025

(54) ELECTRONIC APPARATUS AND CONTROL METHOD THEREOF

(71) Applicant: SAMSUNG ELECTRONICS CO., LTD., Suwon-si (KR)

(72) Inventors: Tien Oanh Le, Hanoi (VN); Duy Thong Bui, Hanoi (VN); Quang Huy Le, Hanoi (VN); Van Huy Bui, Hanoi (VN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 179 days.

(21) Appl. No.: 18/117,771

(22) Filed: Mar. 6, 2023

(65) Prior Publication Data

US 2023/0280858 A1    Sep. 7, 2023

Related U.S. Application Data

(63) Continuation of application No. PCT/KR2022/020004, filed on Dec. 9, 2022.

(30) Foreign Application Priority Data

Mar. 4, 2022   (KR) .................. 10-2022-0028366

(51) Int. Cl.
  *G06F 3/041*     (2006.01)
(52) U.S. Cl.
  CPC .......... *G06F 3/0416* (2013.01); *G06F 3/0412* (2013.01)
(58) Field of Classification Search
  CPC .......... G06F 3/0416; G06F 3/041; G06F 3/03; G06F 3/01; G06F 3/0412
  See application file for complete search history.

(56) References Cited

U.S. PATENT DOCUMENTS

| 8,970,580 B2 | 3/2015 | Jang et al. |
| 9,383,840 B2 | 7/2016 | Seto et al. |

(Continued)

FOREIGN PATENT DOCUMENTS

| JP | 5805890 B2 | 11/2015 |
| KR | 10-2010-0122383 A | 11/2010 |

(Continued)

OTHER PUBLICATIONS

"Capture touch and Apple Pencil input as a drawing, and display that content from your app." PencilKit, Apple Developer Documentation, Nov. 29, 2021, 3 pages. [https://developer.apple.com/documentation/pencilkit].

(Continued)

*Primary Examiner* — Pegeman Karimi
(74) *Attorney, Agent, or Firm* — Sughrue Mion, PLLC

(57)    ABSTRACT

An electronic apparatus includes: a touch display; and a processor connected to the touch display, the processor being configured to: based on a predetermined type of a touch input made by continuously touching a plurality of touch points being received through the touch display, render a part of a screen corresponding to a first region of interest which is identified based on first touch coordinate information corresponding to the plurality of touch points; obtain second touch coordinate information corresponding to a predicted touch point which is predicted to be touched after a current time, based on the first touch coordinate information; identify a second region of interest based on the second touch coordinate information; and render a part of the screen corresponding to the second region of interest.

17 Claims, 24 Drawing Sheets

(56) References Cited

U.S. PATENT DOCUMENTS

| | | |
|---|---|---|
| 9,483,176 B2 | 11/2016 | Xiong et al. |
| 9,697,803 B2 | 7/2017 | Xiong |
| 9,933,883 B2 | 4/2018 | Kim et al. |
| 10,331,331 B2 | 6/2019 | Kim et al. |
| 10,338,725 B2 | 7/2019 | Tu et al. |
| 10,365,765 B2 | 7/2019 | Lee et al. |
| 2010/0289826 A1 | 11/2010 | Park et al. |
| 2011/0199377 A1 | 8/2011 | Jang et al. |
| 2011/0235706 A1 | 9/2011 | Demircin et al. |
| 2012/0169646 A1 | 7/2012 | Berkes et al. |
| 2014/0313144 A1 | 10/2014 | Seto et al. |
| 2015/0012868 A1 | 1/2015 | Xiong et al. |
| 2015/0355740 A1 | 12/2015 | Yumoto et al. |
| 2015/0355778 A1 | 12/2015 | Kim et al. |
| 2016/0004375 A1 | 1/2016 | Xiong |
| 2016/0041689 A1* | 2/2016 | Yumoto ............... G06F 3/0446 345/174 |
| 2016/0048265 A1* | 2/2016 | Yumoto ............... G06F 3/0418 345/173 |
| 2016/0092021 A1* | 3/2016 | Tu ....................... G06F 3/04883 345/173 |
| 2016/0368141 A1* | 12/2016 | Touma .................... B25J 13/08 |
| 2017/0083156 A1 | 3/2017 | Lee et al. |
| 2017/0242579 A1* | 8/2017 | Poon ...................... G06N 5/022 |

FOREIGN PATENT DOCUMENTS

| | | |
|---|---|---|
| KR | 10-2014-0103777 A | 8/2014 |
| KR | 10-1661931 B1 | 10/2016 |
| KR | 10-2017-0022333 A | 3/2017 |
| KR | 10-2017-0033656 A | 3/2017 |
| KR | 10-2018-0010555 A | 1/2018 |
| KR | 10-1913212 B1 | 12/2018 |
| KR | 10-2043148 B1 | 11/2019 |
| KR | 10-2161745 B1 | 10/2020 |
| WO | 2010025967 A1 | 3/2010 |
| WO | 2017/030380 A1 | 2/2017 |

OTHER PUBLICATIONS

"Pen interactions and Windows Ink in Windows apps", Dec. 16, 2021, Microsoft Learn, 16 pages. [https://docs.microsoft.com/en-us/windows/apps/design/input/pen-and-stylusinteractions].

Communication dated Mar. 16, 2023, issued by the International Searching Authority in International Application No. PCT/KR2022/020004 (PCT/ISA/210).

Communication dated Mar. 16, 2023, issued by the International Searching Authority in International Application No. PCT/KR2022/020004 (PCT/ISA/237).

* cited by examiner

ELECTRONIC APPARATUS AND CONTROL METHOD THEREOF

CROSS-REFERENCE TO RELATED APPLICATIONS

This application is a continuation of International Application No. PCT/KR2022/020004, filed on Dec. 9, 2022, in the Korean Intellectual Property Receiving Office, which is based on and claims priority to Korean Patent Application No. 10-2022-0028366, filed on Mar. 4, 2022, in the Korean Intellectual Property Office, the disclosures of which are incorporated by reference herein in their entireties.

BACKGROUND

1. Field

The disclosure relates to an electronic apparatus and a control method thereof, and more particularly, to an electronic apparatus for rendering a screen and a control method thereof.

2. Description of Related Art

With the development of electronic technology, various types of services are being developed. In particular, hardware and software of electronic devices have recently been developed with the popularization of portable electronic devices such as smart phones and tablet personal computers (PCs). For example, electronic devices may be equipped with a high-resolution display and controlled by touching a screen with a pen or a finger.

In this case, a graphics processing unit (GPU) performs rendering in units of frames on the basis of a Vsync but it may be inefficient to render an entire screen for each frame.

For example, as shown in FIG. 1, when a user draws a picture on a region with a pen, frames of a greater part of the entire screen, for example, based on a width (W), a height (H), or an area (W×H) of the screen, may be the same as previous frames and frames of only a very small part thereof may be different from previous frames. That is, it may be inefficient to render the entire screen in terms of processing aspects and power consumption if frames of only a very small part of the entire screen are different from previous frames. Therefore, there is a need for a solution this problem.

SUMMARY

Provided are an electronic apparatus for reducing work load through efficient rendering, thereby reducing power consumption and a control method thereof.

Additional aspects will be set forth in part in the description which follows and, in part, will be apparent from the description, or may be learned by practice of the presented embodiments.

According to an aspect of the disclosure, an electronic apparatus includes: a touch display; and a processor connected to the touch display, the processor being configured to: based on a predetermined type of a touch input made by continuously touching a plurality of touch points being received through the touch display, render a part of a screen corresponding to a first region of interest which is identified based on first touch coordinate information corresponding to the plurality of touch points; obtain second touch coordinate information corresponding to a predicted touch point which is predicted to be touched after a current time, based on the first touch coordinate information; identify a second region of interest based on the second touch coordinate information; and render a part of the screen corresponding to the second region of interest.

The processor may be further configured to: identify the second region of interest based on the second touch coordinate information being outside the first region of interest; and maintain the first region of interest based on the second touch coordinate information being within the first region of interest.

The processor may be further configured to: obtain a speed and acceleration corresponding to the touch input, based on information about a touch point detected at the current time and information about a touch point detected immediately before the current time; and obtain the second touch coordinate information, based on the speed and the acceleration.

The processor may be further configured to: obtain information about touch points detected during a predetermined time period before the current time among the plurality of touch points; obtain a plurality of accelerations corresponding to the touch points, based on the information about the touch points; obtain a speed corresponding to the current time, based on the information about the touch point at the current time and the information about the touch point detected immediately before the current time; and obtain the second touch coordinate information, based on the speed and a highest acceleration among the plurality of accelerations, and wherein the predetermined time period may include a sampling period of the screen displayed on the touch display.

The processor may be further configured to: render the screen corresponding to a basic region of interest based on the electronic apparatus being in a first mode; and change the first mode to a second mode and render the part of the screen corresponding to the first region of interest, based on the touch input being received.

The processor may be further configured to: update the basic region of interest based on at least one of a shape, resolution, dots per inch (DPI), or layout of the touch display being changed while the electronic apparatus is in the first mode, and render a part of the screen corresponding to the updated basic region of interest.

The processor may be further configured to: control the touch display to display the screen including an object; based on a drag input for the object being received through the touch display, render the part of the screen corresponding to the first region of interest identified based on a size of the object and the first touch coordinate information corresponding to the drag input; obtain the second touch coordinate information based on the first touch coordinate information; identify the second region of interest based on the size of the object and the second touch coordinate information; and render the part of the screen corresponding to the second region of interest.

The processor may be further configured to: control the touch display to display the screen including a video; render the part of the screen corresponding to the first region of interest identified based on a position of the displayed video and the first touch coordinate information, when the touch input is received; obtain the second touch coordinate information based on the first touch coordinate information; identify the second region of interest based on the position of the displayed video and the second touch coordinate information; and render the part of the screen corresponding to the second region of interest.

The processor may be further configured to: based on a first predetermined type of a first touch input and a second predetermined type of a second touch input being received, render the part of the screen corresponding to the first region of interest identified based on first-first touch coordinate information corresponding to the first touch input and first-second touch coordinate information corresponding to the second touch input; obtain second-first touch coordinate information corresponding to the predicted touch point based on the first-first touch coordinate information, and obtain second-second touch coordinate information corresponding to the predicted touch point based on the first-second touch coordinate information; identify the second region of interest based on the second-first touch coordinate information and the second-second touch coordinate information; and render the part of the screen corresponding to the second region of interest.

The processor may include: a first processing unit configured to operate based on an operating system; and a second processing unit configured to perform a predetermined operation, and the first processing unit may be further configured to: control the second processing unit to render the part of the screen corresponding to the first region of interest based on the touch input being received through the touch display; obtain the second touch coordinate information based on the first touch coordinate information; identify the second region of interest based on the second touch coordinate information; and control the second processing unit to render the part of the screen corresponding to the second region of interest.

According to an aspect of the disclosure a control method of an electronic apparatus, includes: based on a predetermined type of a touch input made by continuously touching a plurality of touch points being received through a touch display of the electronic apparatus, rendering a part of a screen corresponding to a first region of interest which is identified based on first touch coordinate information corresponding to the plurality of touch points; obtaining second touch coordinate information corresponding to a predicted touch point which is predicted to be touched after a current time, based on the first touch coordinate information; identifying a second region of interest based on the second touch coordinate information; and rendering a part of the screen corresponding to the second region of interest.

The identifying of the second region of interest may include: identifying the second region of interest based on the second touch coordinate information being outside the first region of interest; and maintaining the first region of interest based on the second touch coordinate information being within the first region of interest.

The obtaining of the second touch coordinate information may include: obtaining a speed and acceleration corresponding to the touch input, based on information about a touch point detected at the current time and information about a touch point detected immediately before the current time; and obtaining the second touch coordinate information, based on the speed and the acceleration.

The obtaining of the speed and the acceleration of the touch input may include: obtaining information about touch points detected during a predetermined time period before the current time among the plurality of touch points; obtaining a plurality of accelerations corresponding to the touch points, based on the information about the touch points; obtaining a speed corresponding to the current time, based on the information about the touch point at the current time and the information about the touch point detected immediately before the current time; and obtaining the second touch coordinate information, based on the speed and a highest acceleration among the plurality of accelerations, and the predetermined time period may include a sampling period of the screen displayed on the touch display.

The rendering of the part of the screen corresponding to the first region of interest may include: rendering the screen corresponding to a basic region of interest based on the electronic apparatus being in a first mode; and changing the first mode to a second mode and rendering the part of the screen corresponding to the first region of interest, based on the touch input being received.

BRIEF DESCRIPTION OF THE DRAWINGS

The above and other aspects, features, and advantages of certain embodiments of the present disclosure will be more apparent from the following description taken in conjunction with reference to the accompanying drawings, in which.

DETAILED DESCRIPTION

Figure 1:
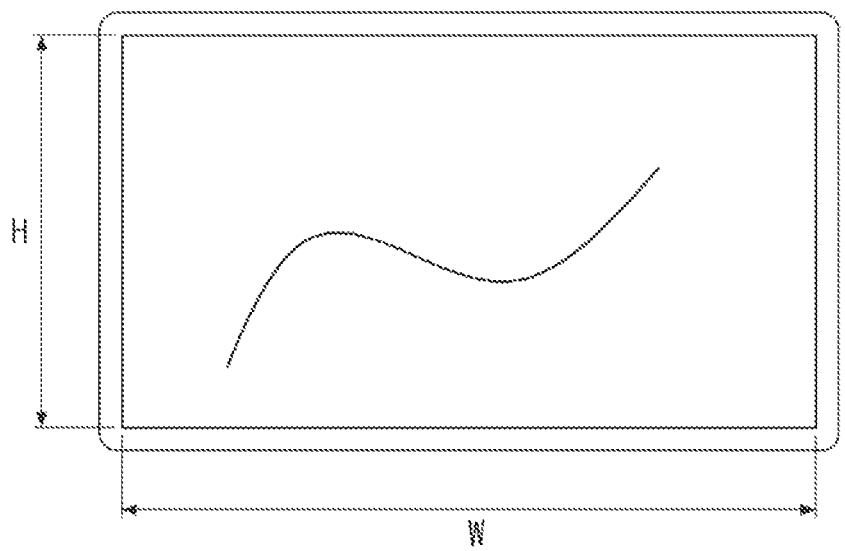
FIG. 1 is a diagram for describing the related art.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

Hereinafter, the disclosure is described in detail with reference to the accompanying drawings.

In embodiments of the disclosure, general terms are selected, if possible, in consideration of functions of the disclosure, but non-general terms may be selected according to the intentions of technicians in the art, precedents, or new technologies, etc. Some terms may be arbitrarily chosen by the present applicant. In this case, the meanings of these terms are explained in corresponding parts of the disclosure in detail. Accordingly, the terms used herein should be defined not based on the names thereof but based on the meanings thereof and the whole context of the disclosure.

As used herein, expressions such as "have", "may have," "include" or "may include" are intended to indicate the presence of features (e.g., a numerical value, a function, an operation, a component of a machine part, etc.) and do not exclude the presence of additional features.

It should be understood that the expression "at least one of A and/or B" indicates "A", "B" or one of "A and B".

As used herein, the terms "first," "second," and the like may be used to describe various elements regardless of order and/or importance and distinguish one element from another element, but these elements should not be limited by these terms.

As used herein, the singular expressions are intended to include plural forms as well, unless the context clearly dictates otherwise. It will further be understood that the terms "comprise" and/or "comprising", when used herein, specify the presence of stated features, integers, steps, operations, elements, components, or a combination thereof, but do not preclude the presence or addition of one or more features, integers, steps, operations, elements, components, or a combination thereof.

As used herein, the term "user" may refer to a person or a device (e.g., an artificial intelligence electronic device) capable of using an electronic apparatus.

Hereinafter, various embodiments of the disclosure are described in more detail with reference to the accompanying drawings.

Figure 2:
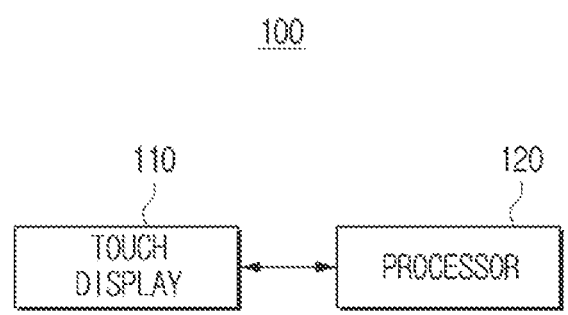
FIG. 2 is a block diagram illustrating a configuration of an electronic apparatus according to an embodiment of the disclosure.

FIG. 2 is a block diagram illustrating a configuration of an electronic apparatus 100 according to an embodiment of the disclosure. As shown in FIG. 2, the electronic apparatus 100 includes a touch display 110 and a processor 120.

The electronic apparatus 100 may be an apparatus that obtains a touch input and displays a touch trajectory corresponding to the touch input. For example, the electronic apparatus 100 may be a smart phone, a tablet PC, or the like, and may be any device capable of receiving a touch input and displaying a touch trajectory corresponding to the touch input.

The touch display 110 may display the touch trajectory corresponding to the touch input under control of the processor 120.

The touch display 110 may include various types of displays such as a liquid crystal display (LCD), an organic light-emitting diode (OLED) display, and a plasma display panel (PDP). A driving circuit, a backlight unit, etc., which are in the form of a thin-film transistor (TFT), a low-temperature polysilicon (LTPS) TFT, or an organic TFT (OTFT), may be included in the touch display 110.

The touch display 110 may be combined with a touch sensor to form a touch screen. Here, the touch sensor may include a touch panel. The touch panel may detect a user's finger gesture input and output a touch event value corresponding to a detected touch signal. The touch panel may be mounted under the touch display 110.

A method of detecting a user's finger gesture input by a touch panel may include a capacitive method. For example, the capacitive method is a method of calculating the coordinates of a touch by detecting microelectricity generated by a user's body. However, embodiments are not limited thereto, and the touch panel may include two electrode plates and a pressure sensitive method of detecting current and calculating the coordinates of a touch when portions of the two electrode plates corresponding to a touched point are brought into contact with each other may be used.

In embodiments, the touch display 110 may calculate the coordinates of the touch through an infrared sensor instead of the touch panel. For example, a plurality of infrared transmitters may be provided on left and upper bezels of the electronic apparatus 100 and a plurality of infrared receivers corresponding to the plurality of infrared transmitters may be provided on right and lower bezels of the electronic apparatus 100. The infrared transmitter on the left bezel of the electronic apparatus 100 may emit infrared rays toward the right bezel of the electronic apparatus 100, and the infrared receiver on the left bezel of the electronic apparatus 100 may receive the infrared rays. The infrared transmitter on the upper bezel of the electronic apparatus 100 may emit infrared rays toward the lower bezel of the electronic apparatus 100, and the infrared receiver on the lower bezel of the electronic apparatus 100 may receive the infrared rays.

In this case, when an object is located on a surface of the electronic apparatus 100, an infrared receiver cannot receive infrared rays, and x and y coordinates of the object may be determined by a position of the infrared receiver on a bezel.

The touch display 110 may further include a pen recognition panel. The pen recognition panel may detect a user's pen gesture input as a touch pen (e.g., a stylus pen or digitizer pen) is operated by the user, and output a pen proximity event value or a pen touch event value. The pen recognition panel may be mounted under the touch display 110.

The pen recognition panel may be implemented, for example, by an EMR method and may detect a touch or a proximity input according to a change in the intensity of an electromagnetic field caused by the approaching of a pen or a touch made by the pen. Specifically, the pen recognition panel may include an electromagnetic induction coil sensor having a grid structure and an electronic signal processor that sequentially supplies an alternating current signal having a certain frequency to each of loop coils of the electromagnetic induction coil sensor. When a pen including a resonance circuit therein is located near a loop coil of the pen recognition panel, a magnetic field transmitted from the loop coil generates a current based on mutual electromagnetic induction in the resonance circuit of the pen. An induction magnetic field is generated based on the current by a coil of the resonance circuit of the pen, and the pen recognition panel detects the induction magnetic field in the loop coil that is in a signal reception state, thereby detecting a location approached or touched by the pen.

The processor 120 may control overall operations of the electronic apparatus 100. Specifically, the processor 120 may be connected to each component of the electronic apparatus 100 to control overall operations of the electronic apparatus 100. For example, the processor 120 may be connected to components such as the touch display 110 and a memory to control an operation of the electronic apparatus 100.

According to an embodiment, the processor 120 may include a digital signal processor (DSP), a microprocessor, or a time controller (TCON). However, the processor 120 is not limited thereto, and may include or be referred to as at least one of a central processing unit (CPU), a microcontroller unit (MCU), a micro-processing unit (MPU), a controller, an application processor (AP), a communication processor (CP), or an ARM processor. In embodiments, the processor 120 may include a system-on-chip (SoC) storing a processing algorithm, a large-scale integrated (LSI) circuit, or a field programmable gate array (FPGA).

When a predetermined type of touch input made by continuously touching a plurality of touch points is received through the touch display 110, the processor 120 may render a part of a screen corresponding to a first region of interest (ROI) identified based on first touch coordinate information corresponding to the plurality of touch points. For example, when a stroke input is received through the touch display 110, the processor 120 may identify the first ROI on the basis of first touch coordinate information corresponding to the stroke input and render a part of the screen corresponding to the first ROI. For example, the processor 120 may not render the entire screen, thus reducing processing power and power consumption.

The processor 120 may obtain second touch coordinate information corresponding to a touch point to be touched after a current point in time, based on the first touch coordinate information. For example, the processor 120 may obtain the speed and acceleration of a touch input on the basis of information about a touch point at a current point in time and information about a touch point obtained immediately before the current point in time, and obtain the second touch coordinate information on the basis of the speed and acceleration. For example, the processor 120 may obtain information about touch inputs for a predetermined time period before a current point in time among a plurality of touch points, obtain a plurality of accelerations corresponding to the touch points on the basis of the information about the touch points, obtain a speed at the current point in time on the basis of the information about the touch point at the current point in time and the information about the touch point obtained immediately before the current point in time, and obtain the second touch coordinate information on the basis of the speed and a largest acceleration among the plurality of accelerations. Here, the predetermined time period may be a sampling period of a screen displayed on the touch display 110. Because the largest acceleration is used, the processor 120 may obtain the second touch coordinate information by applying a largest margin.

The processor 120 may identify a second ROI on the basis of the second touch coordinate information and render a part of the screen corresponding to the second ROI. For example, the processor 120 may identify the second ROI on the basis of the second touch coordinate information when the second touch coordinate information is outside the first ROI, and maintain the first ROI when the second touch coordinate information is within the first ROI. In this case, when the second touch coordinate information is outside the first ROI, the processor 120 may identify the second ROI by additionally applying a margin to the second touch coordinate information. Alternatively, the processor 120 may maintain the first ROI when the second touch coordinate information is within the first ROI and is smaller than the first ROI. The processor 120 may apply a margin to a region to be rendered through the above operation and render a region reflecting all of a user's touch inputs.

When the electronic apparatus 100 is in a first mode, the processor 120 may render a screen corresponding to a basic ROI, change the first mode to a second mode when a touch input is received, and render a part of a screen corresponding to the first ROI. For example, when the electronic apparatus 100 is in the first mode, the processor 120 may render a screen corresponding to an entire region, change the first mode to the second mode when a touch input is received, and render a part of the screen corresponding to the first ROI corresponding to the touch input. For example, the first ROI may be a predetermined sized rectangular region with a touch point as a center point. The first mode may be an idle mode, and the second mode may be a drawing mode. The processor 120 may perform an operation of rendering a part of the screen only in the drawing mode.

When at least one of a shape, a resolution, dots per inch (DPI), or a layout of the touch display 110 is changed while the electronic apparatus 100 is in the first mode, the processor 120 may update the basic ROI and render a screen corresponding to the updated basic ROI. For example, the processor 120 may change the basic ROI to an expanded region, when the electronic apparatus 100 is a foldable device or a rollable device and the touch display 110 is expanded while the electronic apparatus 100 is in the first mode.

The processor 120 may control the touch display 110 to display a screen including an object, render a part of the screen corresponding to a first ROI identified based on first touch coordinate information corresponding to a size of the object and a drag input related to the object when the drag input is received through the touch display 110, obtain second touch coordinate information on the basis of the first touch coordinate information, identify a second ROI on the basis of the size of the object and the second touch coordinate information, and render a part of the screen corresponding to the second ROI. Through the above operation, the processor 120 may render a ROI by taking into account a change of the position of the object.

The processor 120 may control the touch display 110 to display a screen including a video, render a part of a screen corresponding to a first ROI identified based on a position of the displayed video and first touch coordinate information when a touch input is received, obtain second touch coordinate information on the basis of the first touch coordinate information, identify a second ROI on the basis of the position of the displayed video and the second touch coordinate information, and render a part of the screen corresponding to the second ROI. An image may vary for each frame of a video, and the processor 120 may render a ROI including the video through the operation described above.

When a predetermined type of a first touch input and a predetermined type of a second touch input are received, the processor 120 may render a part of a screen corresponding to a first ROI identified based on first-first touch coordinate information corresponding to the first touch input and first-second touch coordinate information corresponding to the second touch input, obtain second-first touch coordinate information corresponding to a touch point to be touched after a current point in time on the basis of the first-first touch coordinate information, obtain second-second touch coordinate information corresponding to the touch point to be touched after the current point in time on the basis of the first-second touch coordinate information, identify a second ROI on the basis of the second-first touch coordinate information and the second-second touch coordinate information, and render a part of the screen corresponding to the second ROI. In this case, the processor 120 may identify a rectangular region, which includes both the first touch coordinate information and second touch coordinate information, as the second ROI. Through the operation described above, even when there are a plurality of touches, the processor 120 may render a screen to change to correspond to the plurality of touches.

The processor 120 may include a first processing unit that operates based on an operating system and a second processing unit that performs a predetermined operation. When a touch input is received through the touch display 110, the first processing unit may control the second processing unit to render a part of a screen corresponding to a first ROI, obtain second touch coordinate information on the basis of first touch coordinate information, identify a second ROI on the basis of the second touch coordinate information, and control the second processing unit to render a part of the screen corresponding to the second ROI. Here, the first processing unit may be a central processing unit (CPU) and the second processing unit may be a graphics processing unit (GPU).

Figure 3:
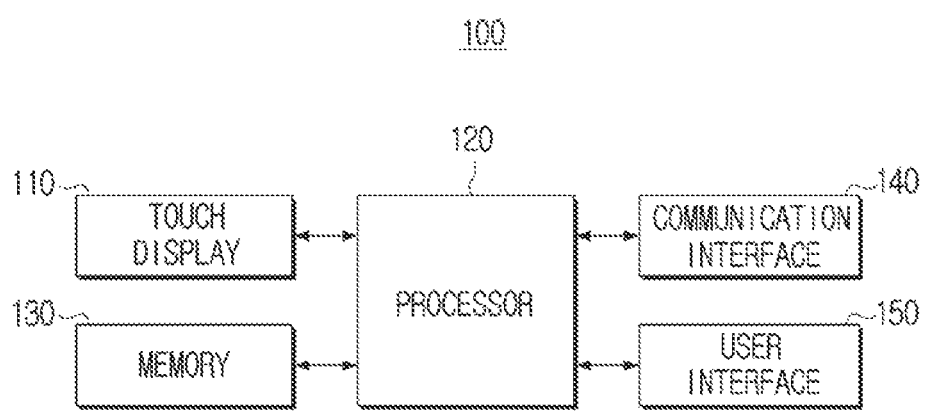
FIG. 3 is a detailed block diagram illustrating a configuration of an electronic apparatus according to an embodiment of the disclosure.

FIG. 3 is a detailed block diagram illustrating a configuration of an electronic apparatus 100 according to an embodiment of the disclosure. The electronic apparatus 100 may include a touch display 110 and a processor 120. Referring to FIG. 3, the electronic apparatus 100 may further include a memory 130, a communication interface 140, and a user interface 150. A detailed description of components shown in FIG. 3 that are the same as or similar to those shown in FIG. 2 may be omitted.

The memory 130 may be hardware that stores information such as data in an electrical or magnetic form to be accessible by the processor 120 or the like. To this end, the memory 130 may include at least one hardware of a nonvolatile memory, a volatile memory, a flash memory, a hard disk drive (HDD), a solid-state drive (SSD), a random access memory (RAM), a read-only memory (ROM) or the like.

The memory 130 may store at least one instruction or module necessary for an operation of the electronic apparatus 100 or the processor 120. Here, the at least one instruction may be a code unit instructing an operation of the electronic apparatus 100 or the processor 120, and may be written in a machine language interpretable by a computer. The at least one module may be a set of consecutive instructions for performing an operation in work units.

The memory 130 may store data that is information representing characters, numbers, images, etc. in units of bits or bytes. For example, the memory 130 may store at least one of an object or a video.

The memory 130 may store a rendering module, a module for predicting the coordinates of a touch, a module for predicting a ROI, etc.

The memory 130 may store a neural network model. For example, the memory 130 may store a neural network model for predicting a ROI according to a plurality of touch points.

The memory 130 may be accessed by the processor 120, and the instruction, module, or data may be read, recorded, modified, deleted or updated by the processor 120.

The communication interface 140 may be configured to communicate with various types of external devices according to various types of communication methods. For example, the electronic apparatus 100 may communicate with a server through the communication interface 140.

The communication interface 140 may include a Wi-Fi module, a Bluetooth module, an infrared communication module, and a wireless communication module. Here, each of the communication modules may be in the form of at least one hardware chip.

The Wi-Fi module may establish communication by a WiFi method and the Bluetooth module may establish communication by a Bluetooth method. When the Wi-Fi module or the Bluetooth module is used, various connection information such as a service set identifier (SSID) and a session key may be transmitted and received, communication may be established using the various connection information, and thereafter various types of information may be transmitted or received. The infrared communication module may establish communication by infrared data association (IrDA) for wirelessly transmitting data within a short distance using infrared rays between visual rays and millimeter waves.

The wireless communication module may include at least one communication chip for establishing communication according to various wireless communication standards such as ZigBee, 3rd Generation (3G), 3rd Generation Partnership Project (3GPP), LTE Advanced (LTE-A), 4th Generation (4G), and 5th Generation (5G), in addition to the communication methods described above.

In embodiments, the communication interface 140 may include a wired communication interface such as HDMI, DP, Thunderbolt, USB, RGB, D-SUB, and DVI.

In addition, the communication interface 140 may include at least one of a local area network (LAN) module, an Ethernet module, or a wired communication module for establishing communication using a pair cable, a coaxial cable, an optical fiber cable or the like.

The user interface 150 may include a button, a touch pad, a mouse, a keyboard or the like or may include a touch screen capable of performing both a display function and a control input function. Here, the button may include various types of buttons, such as mechanical buttons, a touch pad, and wheels, which are provided on a certain region such as a front part, a side part, and a rear part of the exterior of the main body of the electronic apparatus 100.

Figure 4:
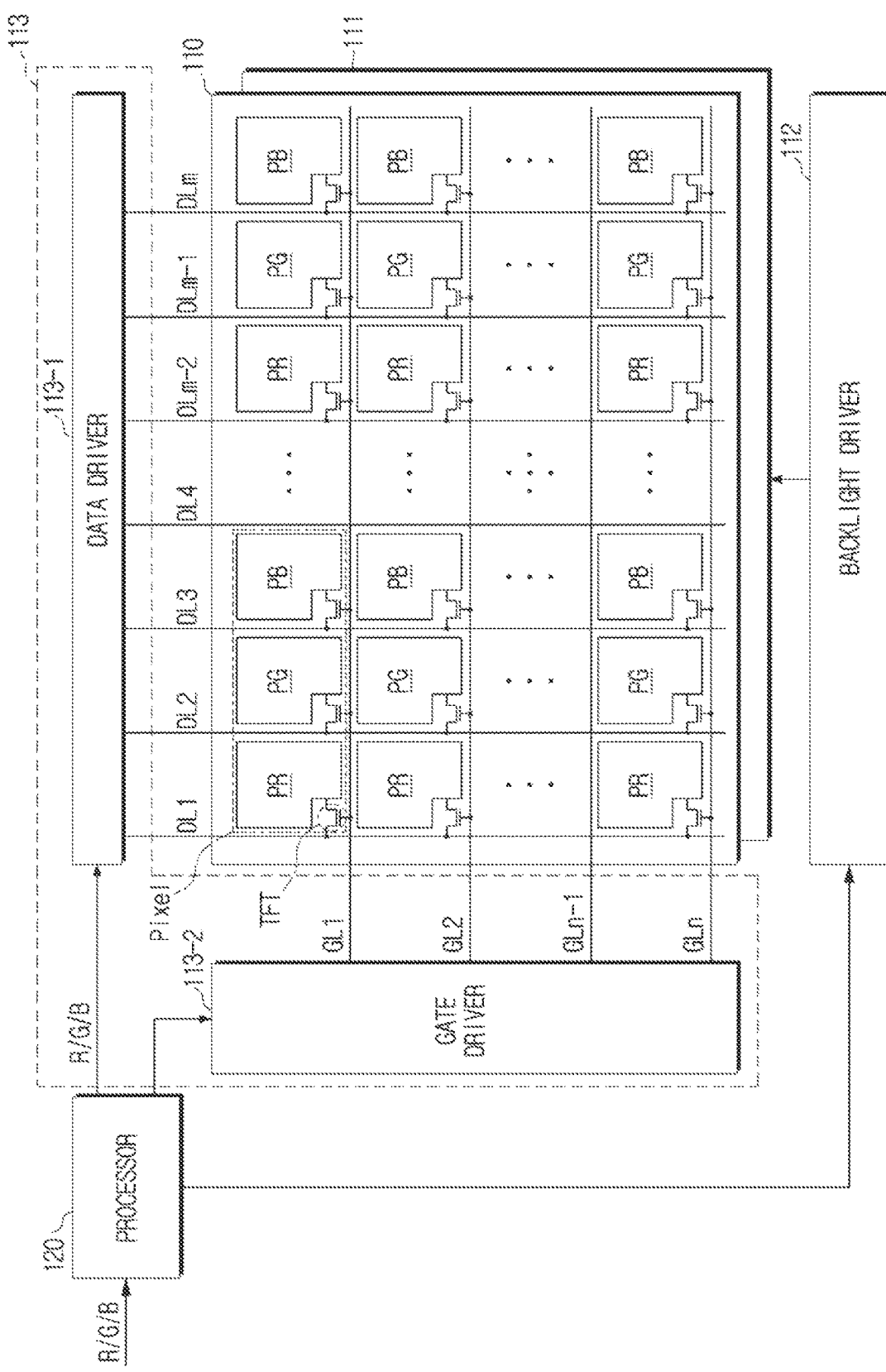
FIG. 4 is a diagram illustrating a structure of a touch display according to an embodiment of the disclosure.

FIG. 4 is a diagram illustrating a structure of a touch display 110 according to an embodiment of the disclosure.

In the touch display 110, gate lines GL1 to GLn and data lines DL1 to DLm are formed to intersect each other, and a red (R) subpixel PR, a green (G) subpixel PG, and a blue (B) subpixel PB may be formed in a region provided at an intersection thereof. Adjacent subpixels PR, PG, and PB may form one pixel. For example, each pixel may include an R subpixel PR emitting red (R) light, a G subpixel PG emitting green (G) light and a B subpixel PB emitting blue light and thus reproduce a color of a subject using three primary colors, i.e., red, green, and blue.

When the touch display 110 includes as an LCD panel, each of the subpixels PR, PG, and PB includes a pixel electrode and a common electrode, and light transmittance changes as a liquid crystal arrangement changes due to an electric field generated due to a potential difference between opposite electrodes. TFTs formed at the intersections of the gate lines GL1 to GLn and the data lines DL1 to DLm may supply video data, i.e., red, green, and blue data, from the data lines DL1 to DLm to the pixel electrodes of the subpixels PR, PG, and PB in response to scan pulses from the gate lines GL1 to GLn.

The touch display 110 may further include a backlight unit 111, a backlight driver 112, and a panel driver 113.

The backlight driver 112 may be in a form including a driver integrated circuit (IC) for driving the backlight unit 111. For example, the driver IC may be implemented as hardware separate from the processor 120. For example, when light sources included in the backlight unit 111 include LED elements, the driver IC may include at least one LED driver that controls current to be supplied to the LED elements. According to an embodiment, the LED driver may be disposed at a rear end of a power supply (e.g., a switching mode power supply (SMPS)) to receive a voltage from the power supply. However, according to another embodiment, a voltage may be applied from a separate power supply device. In embodiments, an SMPS and the LED driver may be embodied together as an integrated module.

The panel driver 113 may include a driver IC for driving the touch display 110. For example, the driver IC may be implemented as hardware separate from the processor 120. For example, the panel driver 113 may include a data driver 113-1 for supplying video data to data lines and a gate driver 113-2 for supplying scan pulses to gate lines.

The data driver 113-1 may be a device that generates a data signal, receives image data of R/G/B components from the processor 120 or a timing controller and generates a data signal. In addition, the data driver 113-1 is connected to the data lines DL1, DL2, DL3, . . . , DLm of the touch display 110 and supplies the generated data signal to the touch display 110.

The gate driver 113-2 (or scan driver) may be a device that generates a gate signal (or scan signal), and is connected to the gate lines GL1, GL2, GL3, . . . , GLn and transmits a gate signal to a certain row of the touch display 110. The data signal output from the data driver 113-1 is transmitted to a pixel to which the gate signal is transmitted.

The processor 120 may control the gate driver 113-2 to drive only some gate lines. For example, the processor 120 may render only a part of a screen rather than the entire screen by driving only some gate lines. Through the operation described above, processing power and power consumption may be reduced.

As described above, the processor 120 may render only some regions of the touch display 110 rather than all regions of the touch display 110 to reduce work load, thereby reducing power consumption.

An operation of the electronic apparatus 100 will be described in more detail with reference to FIGS. 5 to 23 below. Embodiments will be described individually with reference to FIGS. 5 to 23 below for convenience of description. However, the embodiments of FIGS. 5 to 23 may be implemented in combination when needed.

Figure 5:
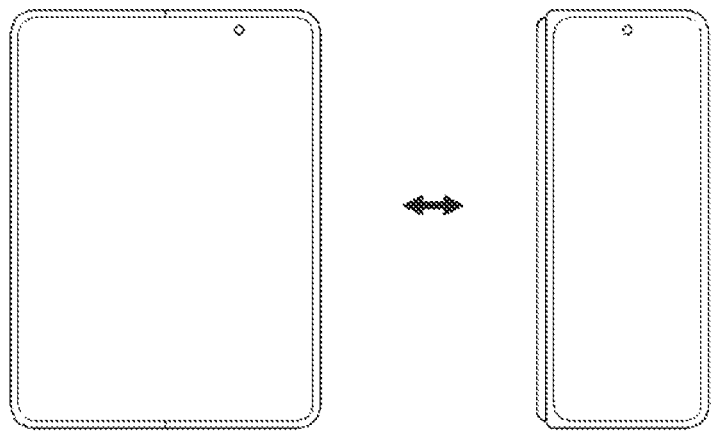
FIGS. 5 and 6 are diagrams for describing updating a basic region of interest (ROI) according to various embodiments of the disclosure.
Figure 6:
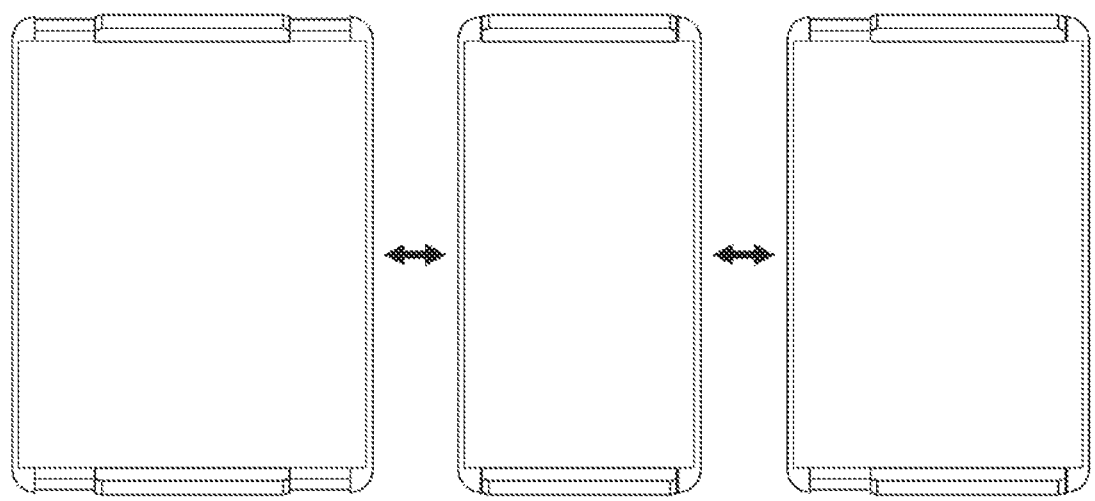

FIGS. 5 and 6 are diagrams for describing updating a basic ROI according to various embodiments of the disclosure.

When the electronic apparatus 100 is in a first mode, the processor 120 may render a screen corresponding to a basic ROI. For example, when the electronic apparatus 100 is in an idle mode, the processor 120 may render all regions of the touch display 110. However, embodiments are not limited thereto, and the processor 120 may render some regions of the touch display 110 even when the electronic apparatus 100 is in the first mode. For example, when the electronic apparatus 100 is in the first mode, the processor 120 may render some regions of the touch display 110 on the basis of an object that is being displayed. Here, the object may include an object, the shape of which changes or the position of which is changed.

When at least one of a shape, a resolution, dots per inch (DPI), or a layout of the touch display 110 is changed while the electronic apparatus 100 is in the first mode, the processor 120 may update a basic ROI and render a screen corresponding to the updated basic ROI. For example, when the electronic apparatus 100 is a foldable apparatus as shown in FIG. 5, the shape of the touch display 110 may change depending on whether the electronic apparatus 100 is folded, and the processor 120 may update the basic ROI according to whether the electronic apparatus 100 is folded and render a screen corresponding to the updated basic ROI. When the electronic apparatus 100 is a rollable device as illustrated in FIG. 6, the processor 120 may update the basic ROI according to a size of a screen of the electronic apparatus 100 and render a screen corresponding to the updated basic ROI.

Thereafter, when a touch input is received, the processor 120 may change the first mode to a second mode and render a part of the screen corresponding to the first ROI identified based on the touch input. Here, the second mode may be a drawing mode.

Figure 7:
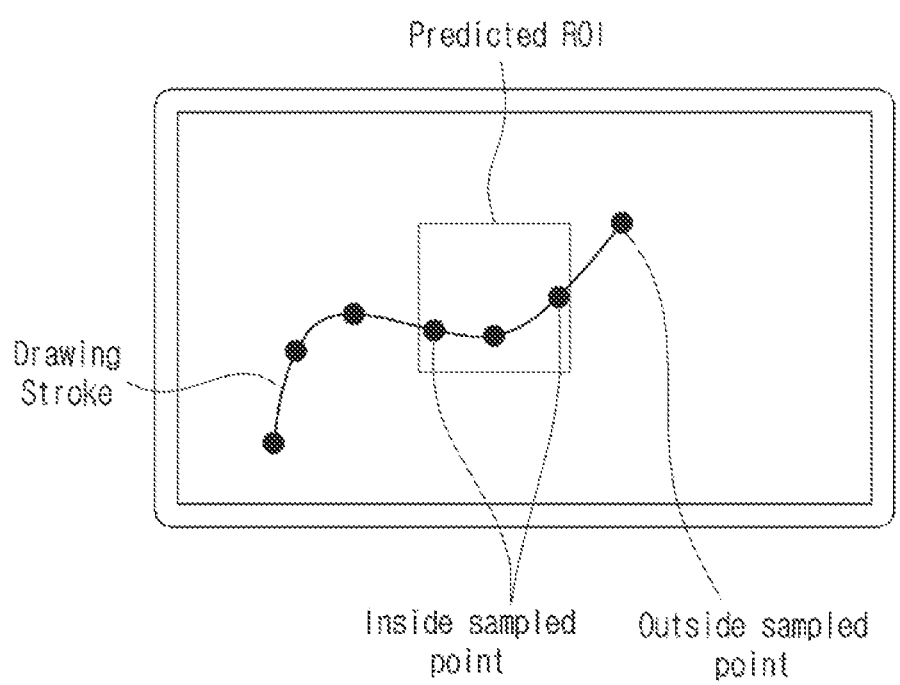
FIG. 7 is a diagram for describing a method of identifying a ROI according to an embodiment of the disclosure.

FIG. 7 is a diagram for describing a method of identifying a ROI according to an embodiment of the disclosure.

The processor 120 may receive a predetermined type of touch input made by continuously touching a plurality of touch points through the touch display 110. For example, the processor 120 may receive a touch input as illustrated in FIG. 7.

The processor 120 may render a part of a screen corresponding to a first ROI identified based on first touch coordinate information corresponding to the plurality of touch points. For example, when a touch input is received from left to right in FIG. 7, the processor 120 may render a part of a screen corresponding to a ROI identified based on a first left touch point and a part of the screen corresponding to a ROI based on a second left touch point. The processor 120 may sequentially change a ROI in this manner, and a ROI may be moved gradually to the right.

In addition, the processor 120 may obtain second touch coordinate information corresponding to a touch point to be touched after a current point in time on the basis of the first touch coordinate information, identify a second ROI on the basis of the second touch coordinate information, and render a part of the screen corresponding to the second ROI. In the above-described example, the processor 120 may predict subsequent touch coordinate information on the basis of the first left touch point and the second left touch point, and identify the second ROI on the basis of the predicted touch coordinate information. Because the touch input is moved from left to right, the second ROI may be moved gradually to the right.

In this case, the processor 120 may identify the second ROI by adding a certain margin. For example, the processor 120 may predict subsequent touch coordinate information on the basis of the first left touch point and the second left touch point of FIG. 7, and identify a rectangular region including the predicted touch coordinate information as the second ROI. In particular, the processor 120 may identify, as the second ROI, a region including points which are spaced a predetermined distance or more from the predicted touch coordinate information in upward, downward, left, and right directions.

The processor 120 may identify the second ROI on the basis of the second touch coordinate information when the second touch coordinate information is outside the first ROI, and maintain the first ROI when the second touch coordinate information is within the first ROI. In this case, the processor 120 may also take into account a margin. For example, the processor 120 may maintain the first ROI only when the second touch coordinate information is spaced the predetermined distance or more from each corner of the first ROI.

Figure 8:
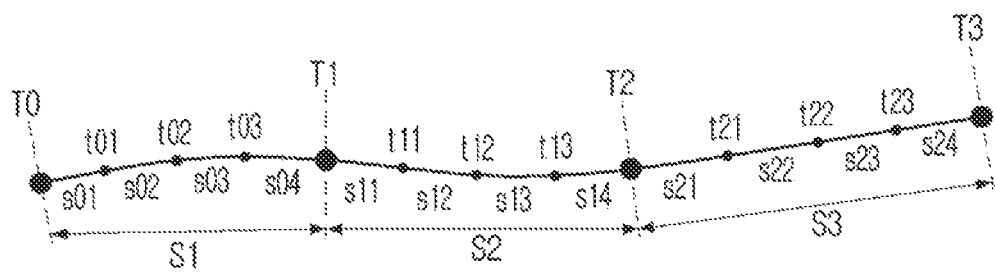
FIGS. 8 to 10 are diagrams for describing a method of obtaining second touch coordinate information according to an embodiment of the disclosure.
Figure 9:
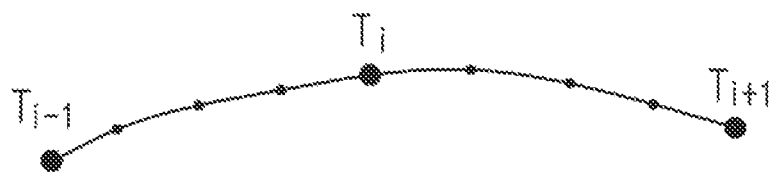
Figure 10:
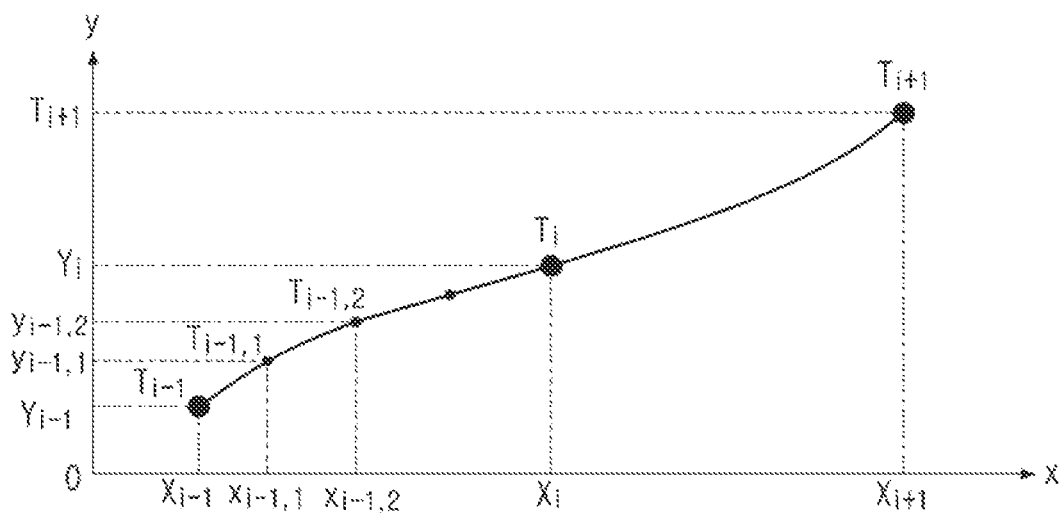

FIGS. 8 to 10 are diagrams for describing a method of obtaining second touch coordinate information according to an embodiment of the disclosure.

In the examples shown in FIGS. 8-10, a touch recognition period and a sampling period of the touch display 110 may be different from each other, and the sampling period may be longer than the touch recognition period, however embodiments are not limited thereto.

The indexes shown in FIG. 8 may be defined as follows:

$T_i$: sampling duration signal ($T_i == t_{i,0}$)
$t_{i,j}$: touch screen sensor sampling
$S_i$: distance of draw stroke between 2 sampling duration signal from $T_{i-1}$ to $T_i$
$S_{i,j}$: distance of drew stroke between 2 touch screen sensing
$V_i$, $v_i$: drawing speed at $T_i$ and $t_{i,j}$, respectively
$A_i$, $a_{i,j}$: acceleration at $T_i$ and $t_{i,j}$, respectively
$t_{frame}$: time between 2 sampling duration signal
$t_{sample}$: time between 2 touch screen sensing
k: number of sampling points in sampling duration
At $T_0$: -ROI=full size of layer
$V_0 = v_{0,0} = 0$ When the indexes are defined as described above, the processor 120 may obtain acceleration and a speed on the basis of $T_{i-1}$, $T_i$ of FIG. 9, according to Equations 1-5 below:

At $t_{i,j}$:

$$v_{i-1,j} = s_{i-1,j}/t_{sample} \quad \text{(Equation 1)}$$

$$a_{i-1,j} = (v_{i-1,j} - v_{i-1,j-1})/t_{sample} \quad \text{(Equation 2)}$$

$$S_{i-1} = \sum_{j=0}^{k} s_{i-1,j} \quad \text{(Equation 3)}$$

$$A_i = \max(a_{i-1,j}) \quad \text{(Equation 4)}$$

$$V_i = V_{i-1} + A_i * t_{frame} \quad \text{(Equation 5)}$$

The processor 120 may obtain the second touch coordinate information according to $T_{i+1}$, based on the obtained acceleration and speed, according to Equations 6-9 below:

$$v_{i,0} = V_i \quad \text{(Equation 6)}$$

$$v_{i,j} = v_{i,j-1} + A_i * t_{sample} \quad \text{(Equation 7)}$$

$$s_{i,j} = v_{i,j-1} * t_{sample} + A_i * t_{sample}^2/2 \quad \text{(Equation 8)}$$

$$S_i = \sum_{j=0}^{k} s_{i,j} \quad \text{(Equation 9)}$$

The processor 120 may identify the size of the second ROI on the basis of the second touch coordinate information according to Equation 10 below:

$$P = \alpha * S_i + \Delta \quad \text{(Equation 10)}$$

In Equation 10, If $P < ROI_{min}$, then $P = ROI_{min}$. Further, $\alpha$ indicates a parameter of predict partial update region (ex $\alpha=2$), and $\Delta$ indicates a thickness of stroke+deviation.

The processor 120 may obtain the second touch coordinate information and the second ROI by the above-described method. In embodiments, as shown in FIG. 10, the processor 120 may obtain the second touch coordinate information and the second ROI by distinguishing between an X component and a Y component, and this method is only a simple mathematical technique and thus a detailed description thereof is omitted here.

Figure 11:
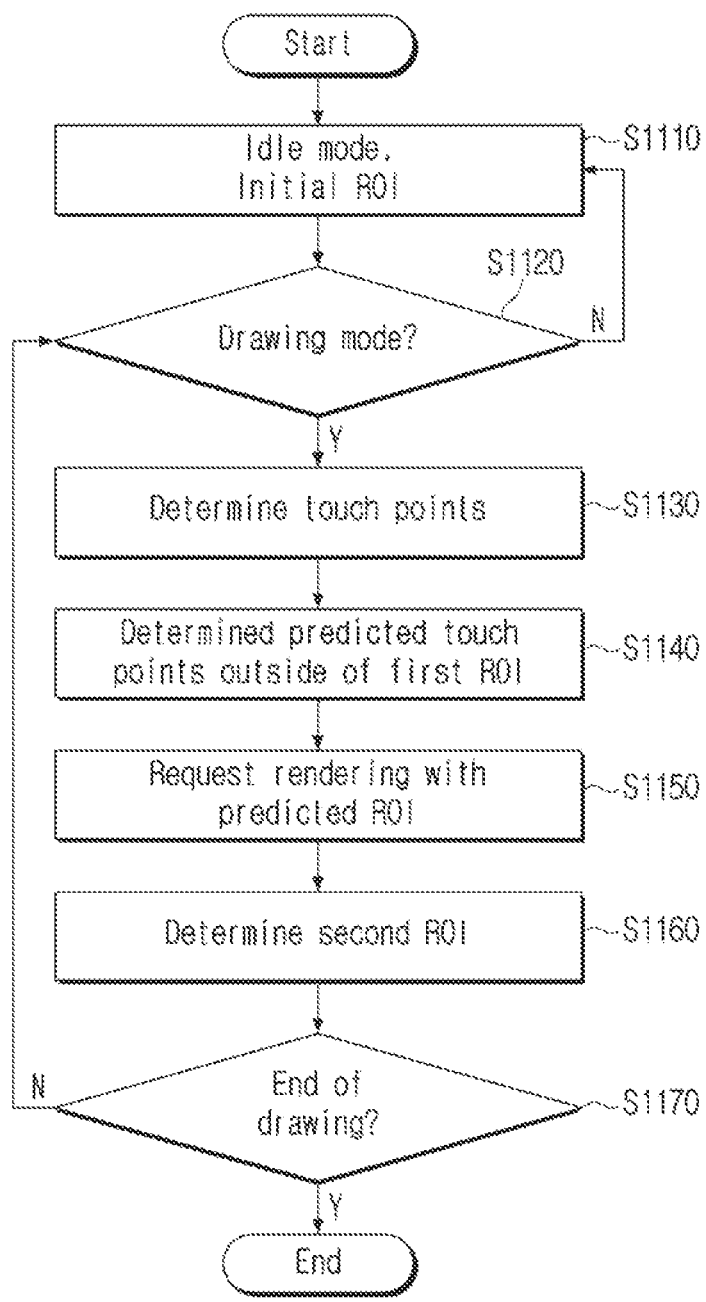
FIG. 11 is a flowchart of an overview of a rendering operation according to an embodiment of the disclosure.

FIG. 11 is a flowchart of an overview of a rendering operation according to an embodiment of the disclosure.

When the electronic apparatus 100 is in the idle mode, the processor 120 may render a screen corresponding to a basic ROI at operation S1110.

The processor 120 may determine whether a mode of the electronic apparatus 100 is the drawing mode at operation S1120, and may maintain the idle mode when the mode is not the drawing mode and determine a plurality of touch points when the mode is changed to the drawing mode at operation S1130.

Next, the processor 120 may determine whether a touch point to be touched after a current point in time, which is predicted on the basis of a plurality of touch points, is outside a first ROI at operation S1140.

The processor 120 may render a screen corresponding to the first ROI or control an external component such as a GPU to render the screen corresponding to the first ROI at operation S1150.

The processor 120 may determine a second ROI on the basis of the predicted touch point at operation S1160. The processor 120 may determine whether the drawing mode ends at operation S1170, and may end a prediction operation when the drawing mode ends and perform operation S1120 when the drawing mode is maintained.

Figure 12:
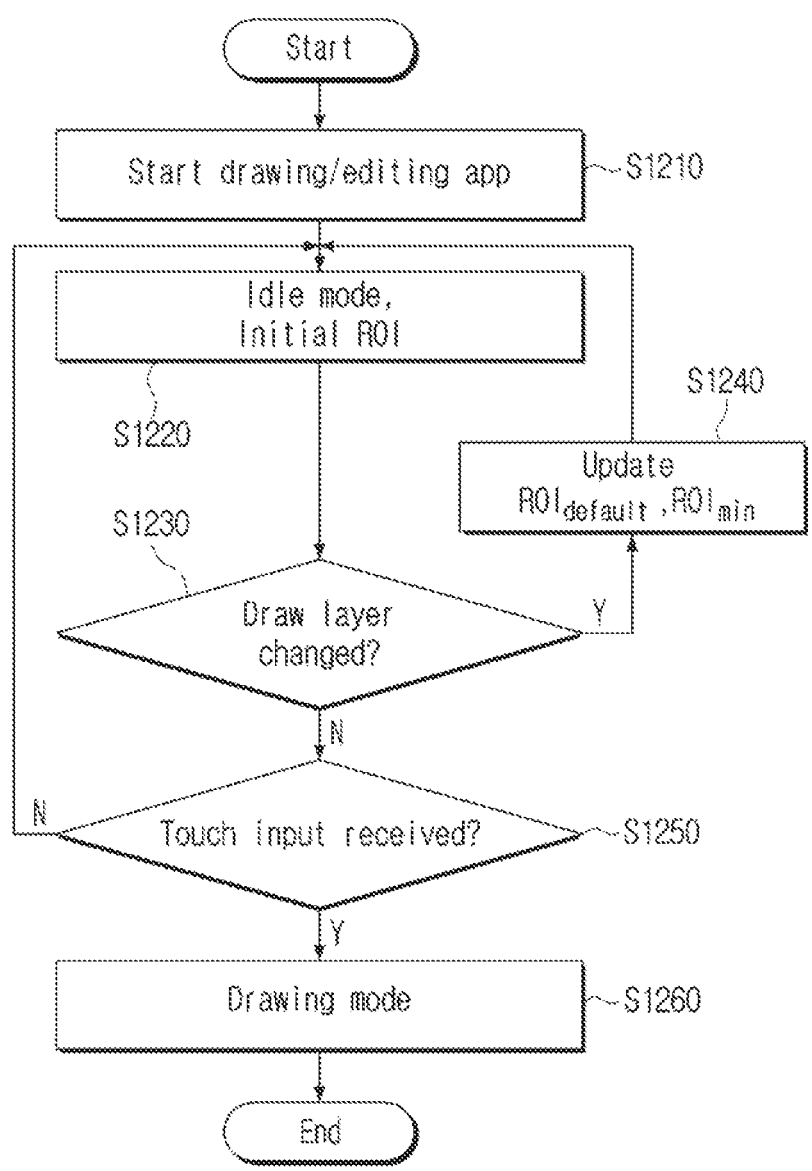
FIG. 12 is a flowchart for describing changing a mode according to an embodiment of the disclosure.

FIG. 12 is a flowchart for describing changing a mode according to an embodiment of the disclosure.

First, a drawing/editing application is executed at operation S1210. In this case, the electronic apparatus 100 may operate in the idle mode at operation S1220 and the processor 120 may render a basic ROI. Here, the basic ROI may be an entire region of the touch display 110 but may be a region of the touch display 110 in which an object has changed.

The processor 120 may identify whether at least one of a shape, resolution, dpi, or layout of the touch display 110 has changed at operation S1230, and update the basic ROI when at least one of the shape, resolution, dpi, or layout of the touch display 110 has changed at operation S1240 and determine whether there is a touch input when at least one of a shape, resolution, dpi, or layout of the touch display 110 has not changed at operation S1250.

The processor 120 may perform operation S1220 when a touch input is received, and change the idle mode to the drawing mode when a touch input is received at operation S1260.

Figure 13:
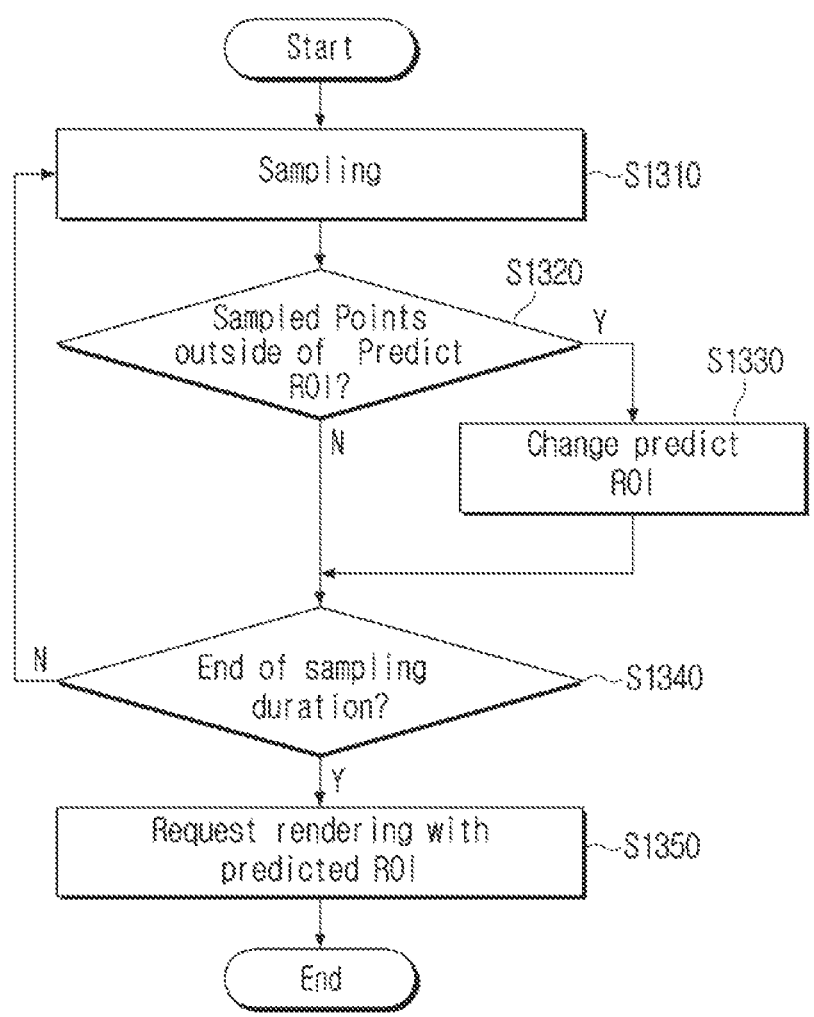
FIG. 13 is a flowchart of a method of identifying a second ROI according to an embodiment of the disclosure.

FIG. 13 is a flowchart of a method of determining a second ROI according to an embodiment of the disclosure.

The processor 120 may perform sampling at operation S1310 and determine whether a sampled point is outside a ROI at operation S1320. The processor 120 may change the ROI on the basis of the sampled point when the sampled point is outside the ROI at operation S1330, and determine that sampling may be continuously performed when the sampled point is within the ROI at operation S1340.

The processor 120 may perform operation S1310 when sampling is continuously performed, and render a screen corresponding to the ROI when sampling is not continuously performed at operation S1350.

Figure 14:
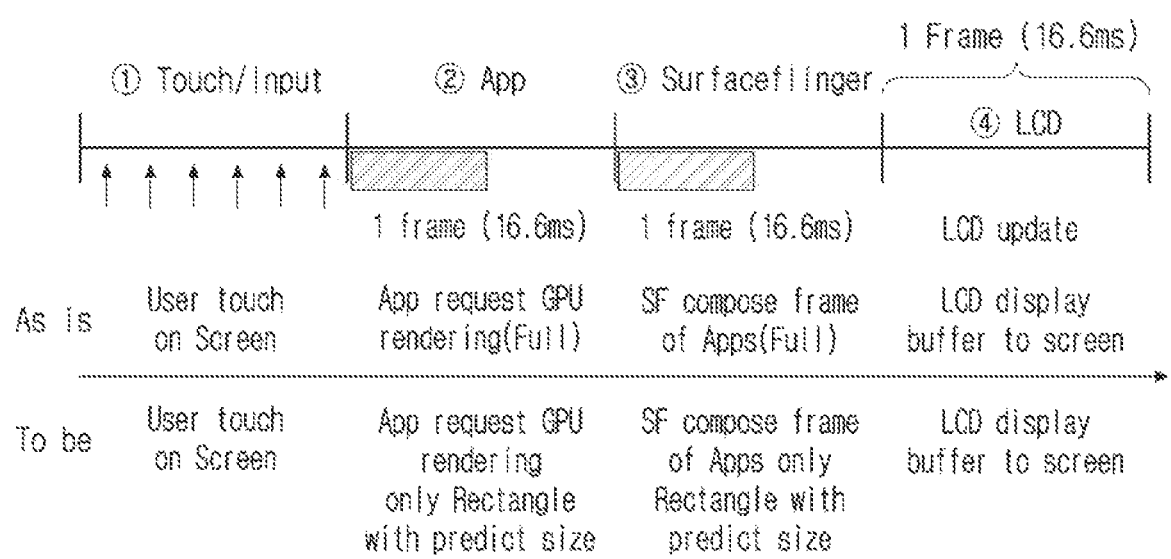
FIGS. 14 to 16 are diagrams for describing effects according to an embodiment of the disclosure.
Figure 15:
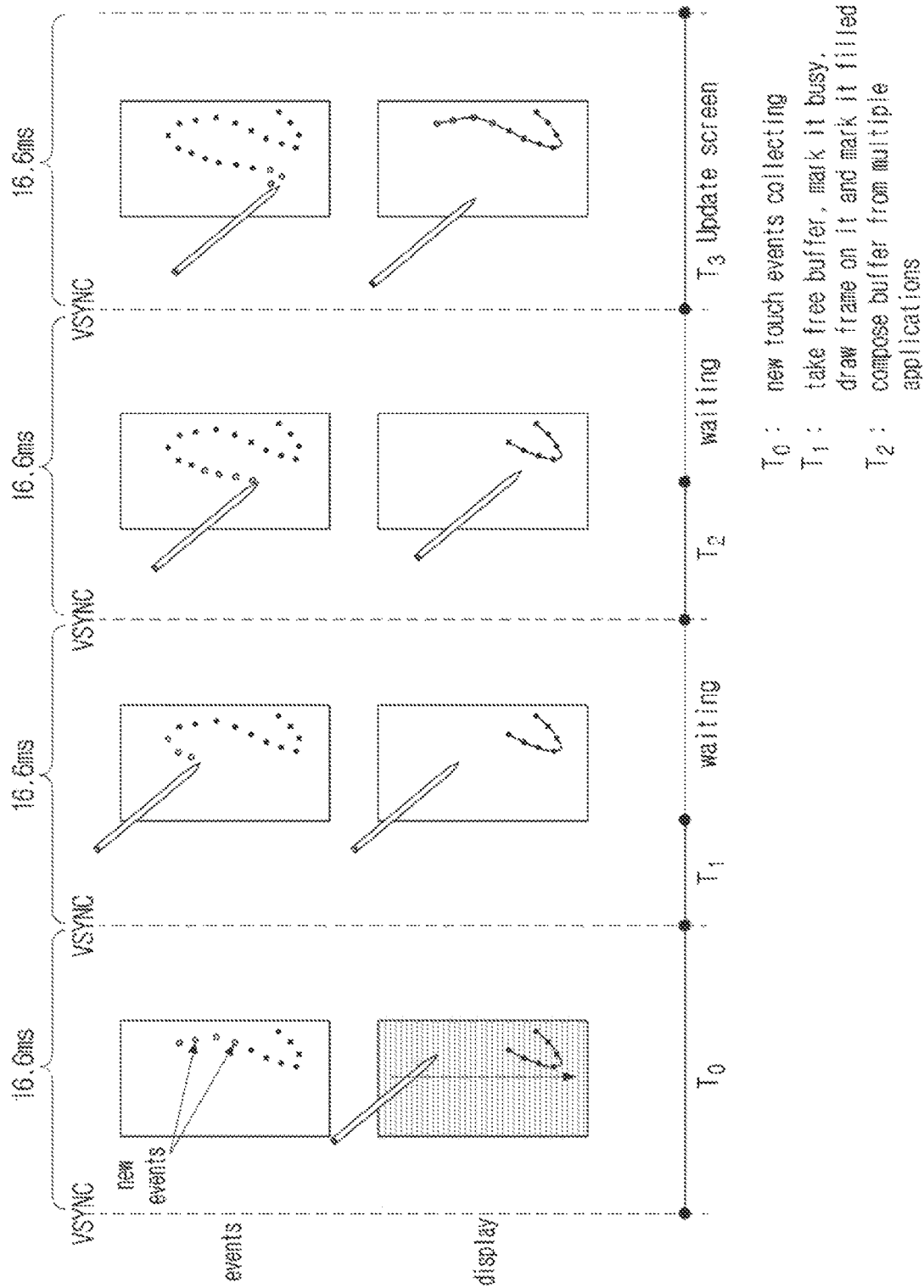
Figure 16:
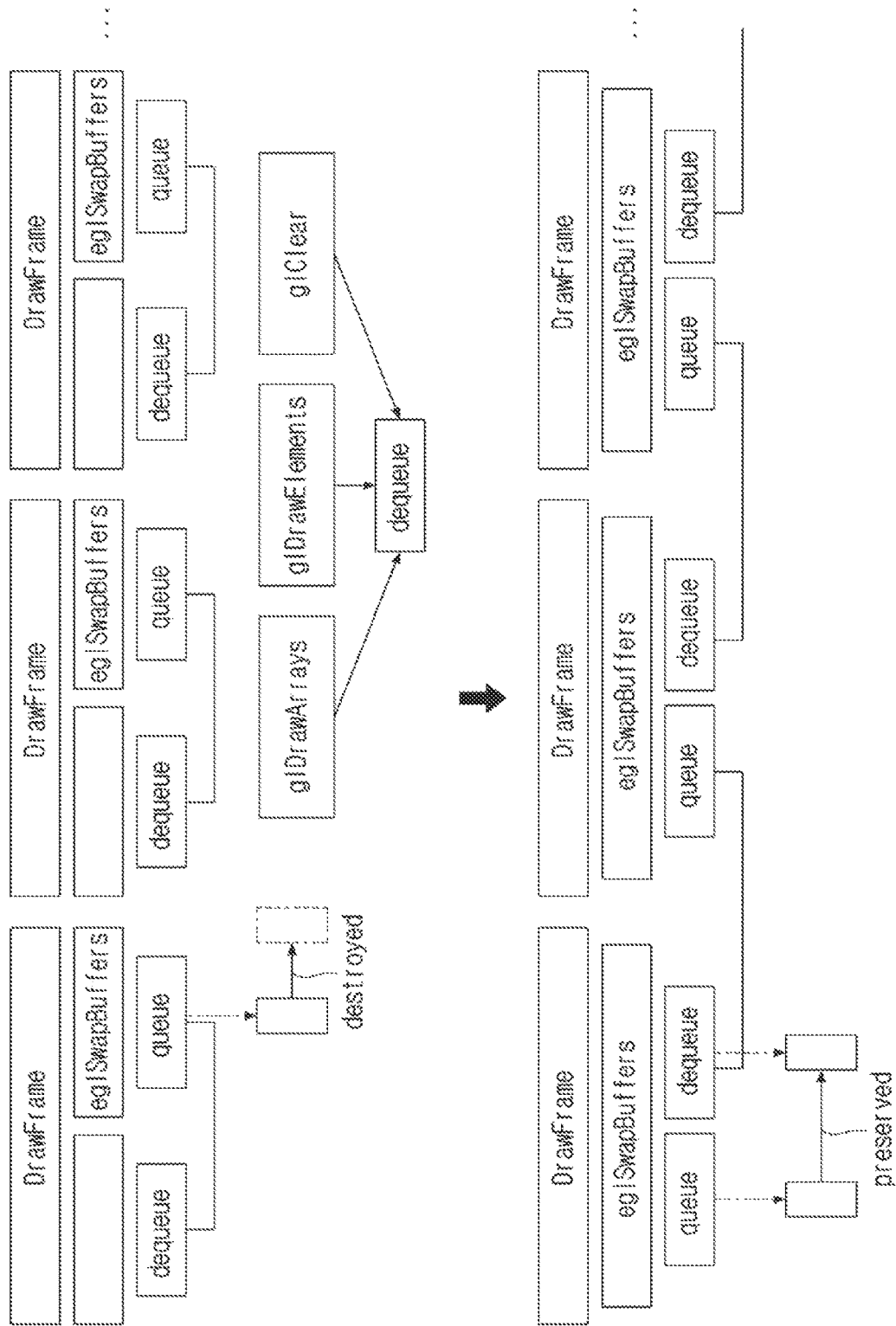

FIGS. 14 to 16 are diagrams for describing effects according to an embodiment of the disclosure.

Operations performed in response to a touch input may include four operations as shown in FIG. 14. The operations of FIG. 14 may correspond to the operations of FIG. 15.

First, when a user draws a picture on a screen, the processor 120 may identify a touch point (operation ①). In addition, the application may obtain a touch point in a Vsync duration, request an image after an application rendering frame ends, and is transmitted from a buffer to a Surface-Flinger (operation ②). The SurfaceFlinger may process the frame (operation ③), and a screen may be output through a touch display (operation ④). In general, it may take three Vsync cycles to display a screen after touching is performed.

Here, in related art electronic devices, rendering may be performed on an entire screen, whereas according to embodiments, rendering may be performed on only some regions of a screen in operations ② and ③.

As shown in FIG. 16, the processor 120 may render an entire screen and data stored in a buffer is deleted.

In contrast, according to embodiments, the processor 120 may use previous data stored in a buffer and a result of rendering some regions may be updated. Power consumption may be reduced through the above operation.

Figure 17:
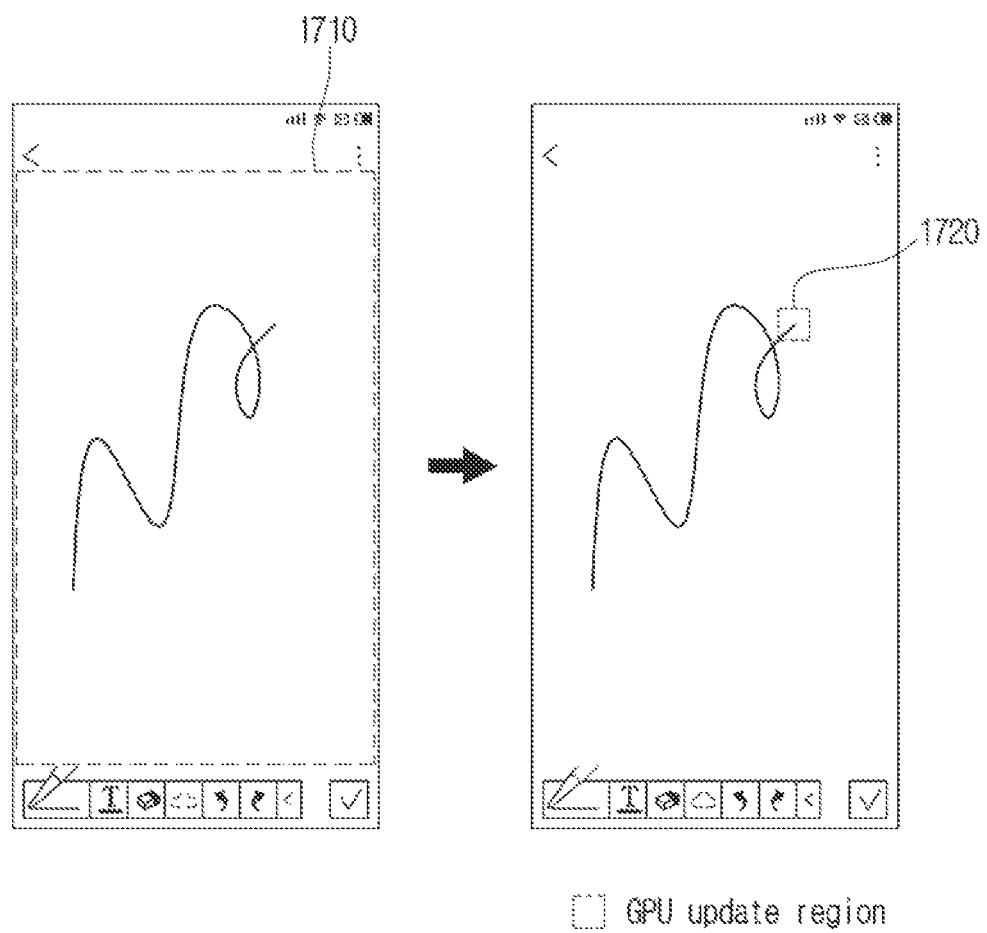
FIG. 17 is a diagram for describing a second ROI according to an embodiment of the disclosure.

FIG. 17 is a diagram for describing a second ROI according to an embodiment of the disclosure.

When a touch input is received, the processor 120 may identify a touch point to be touched after a current point in time on the basis of a previous touch point, identify a second ROI on the basis of the identified touch point, and render only the second ROI.

For example, as illustrated in FIG. 17, when a touch input from a left lower end to a right upper end is received, according to embodiments, the processor 120 may render only a region 1720, instead of rendering an entire region 1710.

Here, a size of the region 1720 may be determined by a touch sampling rate. For example, when the touch sampling rate is relatively high, the size of the region 1720 may be smaller than when the touch sampling rate is relatively low.

Figure 18:
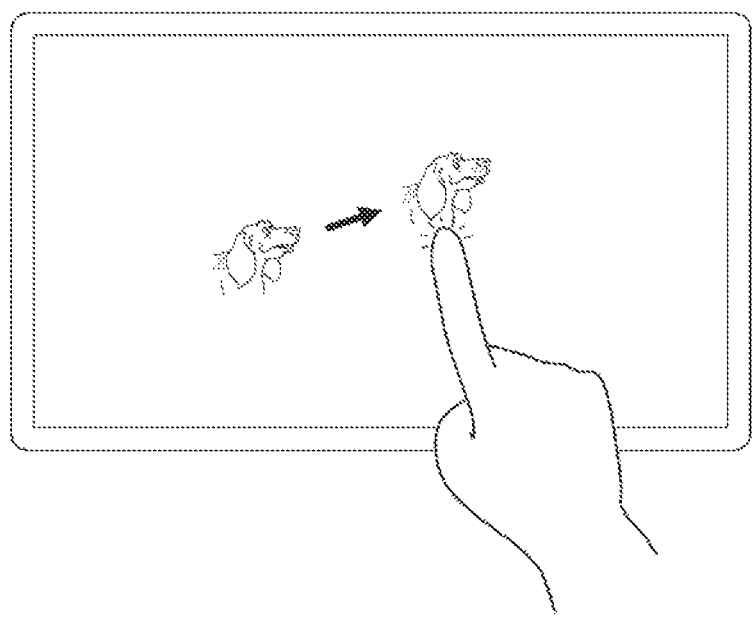
FIGS. 18 and 19 are diagrams for describing a case in which an object is displayed according to another embodiment of the disclosure.
Figure 19:
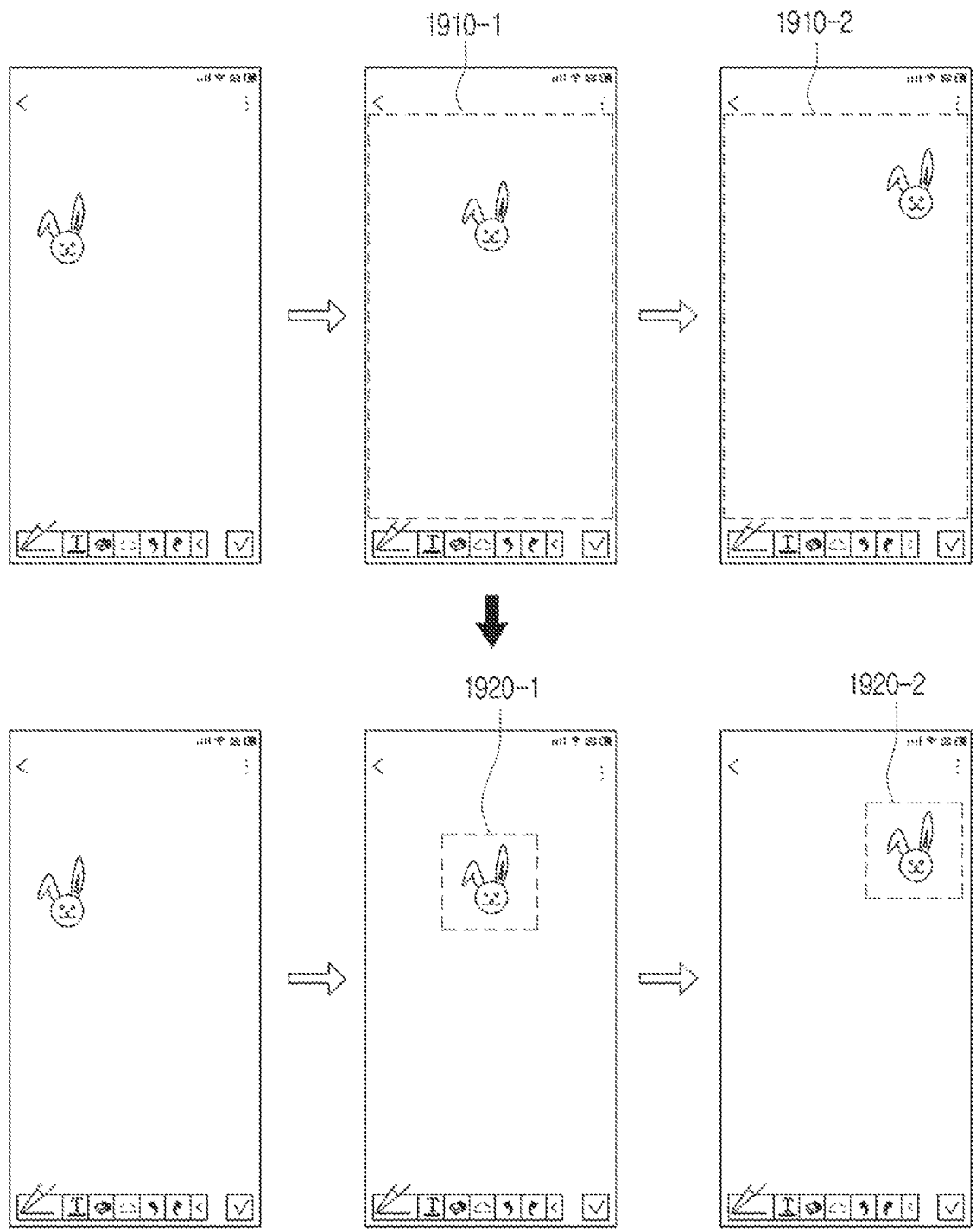

FIGS. 18 and 19 are diagrams for describing a case in which an object is displayed according to another embodiment of the disclosure.

The processor 120 may control the touch display 110 to display a screen including an object, render a part of the screen corresponding to a first ROI identified based on first touch coordinate information corresponding to a size of the object and a drag input related to the object when the drag input is received through the touch display 110, obtain second touch coordinate information on the basis of the first touch coordinate information, identify a second ROI on the basis of the size of the object and the second touch coordinate information, and render a part of the screen corresponding to the second ROI.

For example, as illustrated in FIG. 18, the processor 120 may control the touch display 110 to display a screen including a puppy, render a part of a screen corresponding to a first ROI identified based on first touch coordinate information corresponding to a size of the puppy and a drag input related to the puppy when the drag input is received through the touch display 110, obtain second touch coordinate information on the basis of the first touch coordinate information, identify a second ROI on the basis of the size of the puppy and the second touch coordinate information, and render a part of the screen corresponding to the second ROI.

Here, the processor 120 may identify the first ROI and the second ROI by taking into account not only the size of the object but also a shape of the object. In particular, the processor 120 may identify the first ROI and the second ROI to include all regions corresponding to the object.

As shown in.

in lower drawings of FIG. 19, the processor 120 may render only some regions 1920-1 and 1920-2 including an object, thereby reducing power consumption as compared with the upper drawings of FIG. 19, in which the entire screens 1910-1 and 1910-2 are rendering targets regardless of a position of a displayed object.

Figure 20:
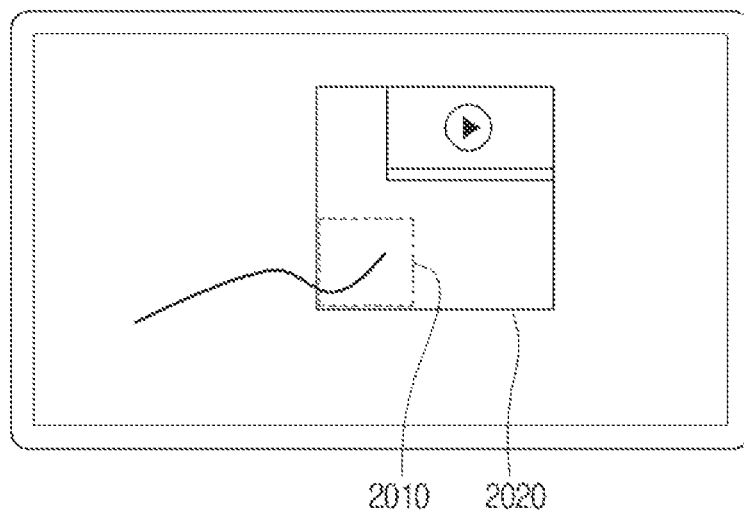
FIGS. 20 and 21 are diagrams for describing a case in which a video is displayed according to another embodiment of the disclosure.
Figure 21:
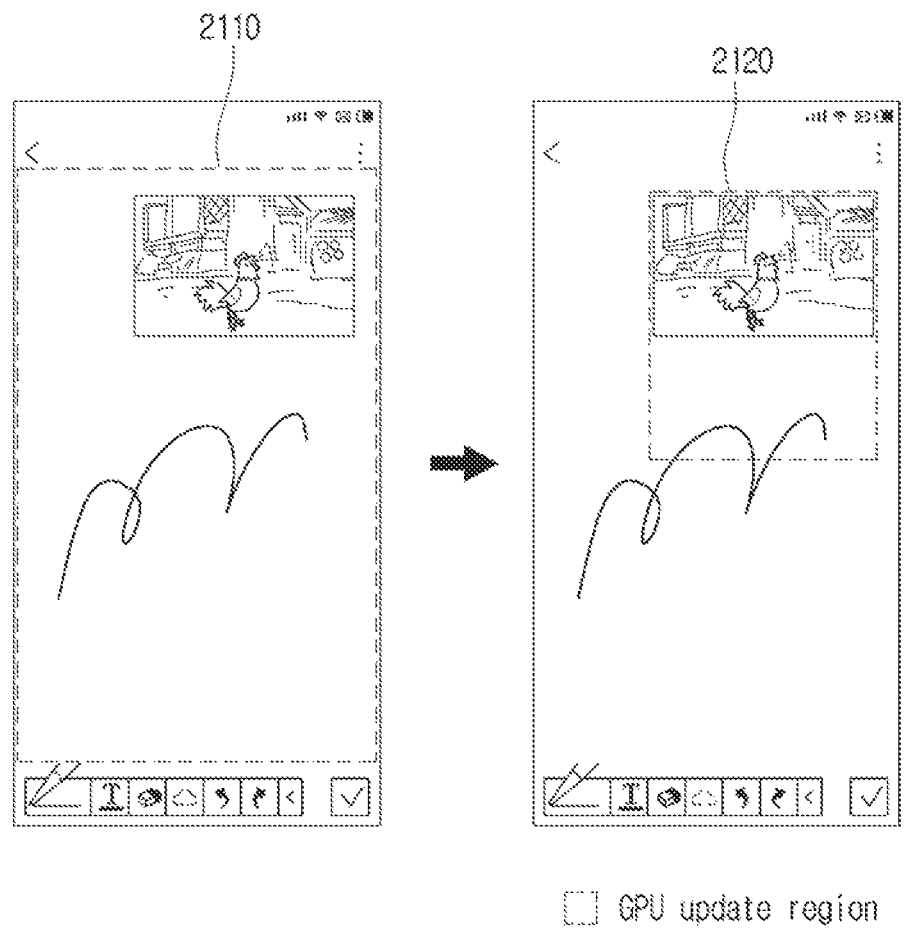

FIGS. 20 and 21 are diagrams for describing a case in which a video is displayed according to another embodiment of the disclosure.

As shown in FIG. 20, the processor 120 may control the touch display 110 to display a screen including a video, may render a part of the screen corresponding to a first ROI identified based on a position of the displayed video and first touch coordinate information when a touch input is received, obtain second touch coordinate information on the basis of the first touch coordinate information, identify a second ROI on the basis of the position of the displayed video and the second touch coordinate information, and render a part of the screen corresponding to the second ROI.

When the video is not considered, the processor 120 may identify only a region 2010 as the second ROI. However, when the video is considered, the processor 120 may identify a region 2020 as the second ROI by taking into account the region 2010 and a display region of the video.

As shown in a right part of FIG. 21, the processor 120 may render only a region 2120, including the position of the displayed video, thereby reducing power consumption as compared to a left part of FIG. 21, in which an entire screen 2110 is a rendering target regardless of a position of a displayed video.

Figure 22:
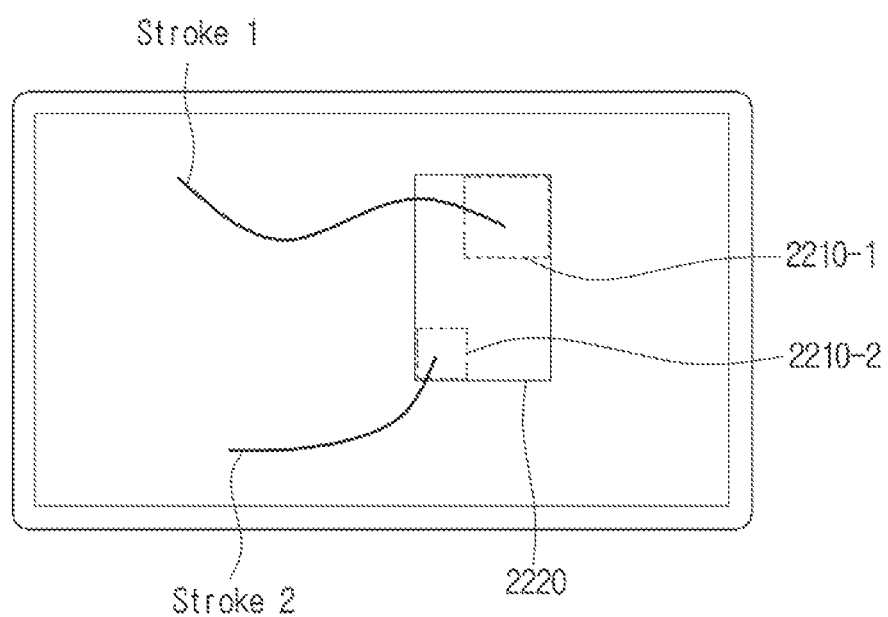
FIGS. 22 and 23 are diagrams for describing a case in which a plurality of touch inputs are received according to another embodiment of the disclosure.
Figure 23:
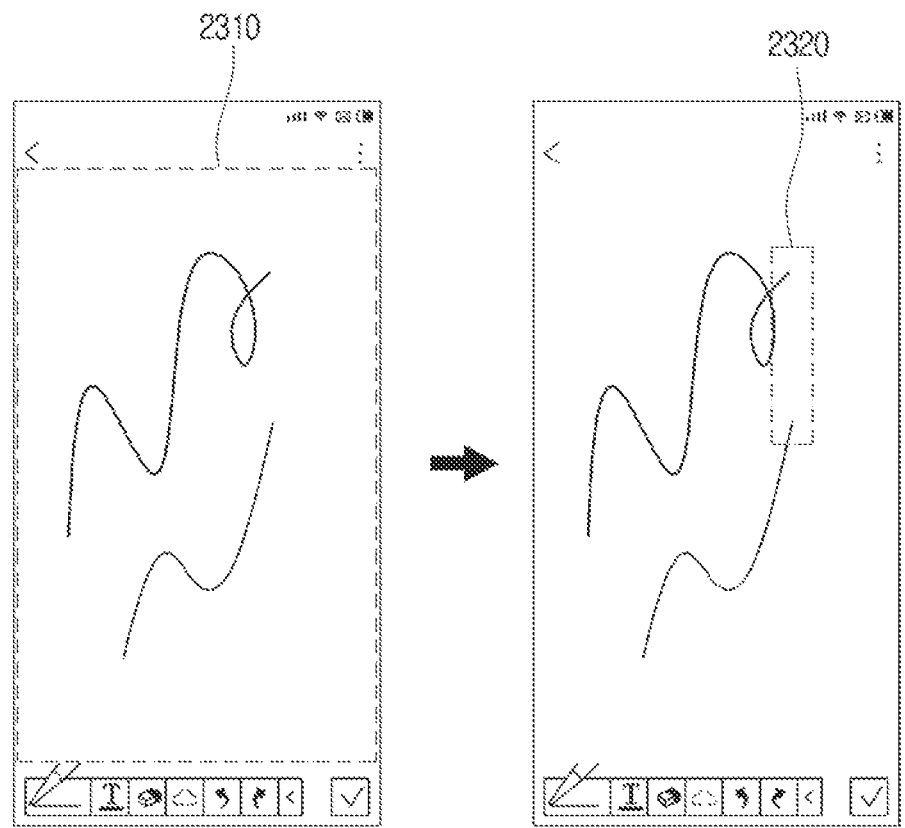

FIGS. 22 and 23 are diagrams for describing a case in which a plurality of touch inputs are received according to another embodiment of the disclosure.

As shown in FIG. 22, when a predetermined type of first touch input (Stroke 1) and a predetermined type of second touch input (Stroke 2) are received, the processor 120 may render a part of a screen corresponding to a first ROI identified based on first-first touch coordinate information corresponding to the first touch input (Stroke 1) and first-second touch coordinate information corresponding to the second touch input (Stroke 2), obtain second-first touch coordinate information corresponding to a touch input to be touched after a current point in time on the basis of the first-first touch coordinate information, obtain second-second touch coordinate information corresponding to the touch input to be touched after the current point in time on the basis of the first-second touch coordinate information, identify a second ROI 2220 on the basis of the second-first touch coordinate information and the second-second touch coordinate information, and render a part of the screen corresponding to the second ROI 2220.

When a plurality of touch inputs are individually considered, the processor 120 may identify regions 2210-1 and 2210-2 as second ROIs. However, when the plurality of touch inputs are considered overall, the processor 120 may identify the second ROI 2220, including both the regions 2210-1 and 2210-2, as the second ROI.

As shown a right part of FIG. 23, the processor 120 may render only a region 2320 by taking into account all of the plurality of touch inputs, thereby reducing power consumption as compared with a left part of FIG. 23, in which an entire screen 2310 is a rendering target regardless of the number of touch inputs.

Figure 24:
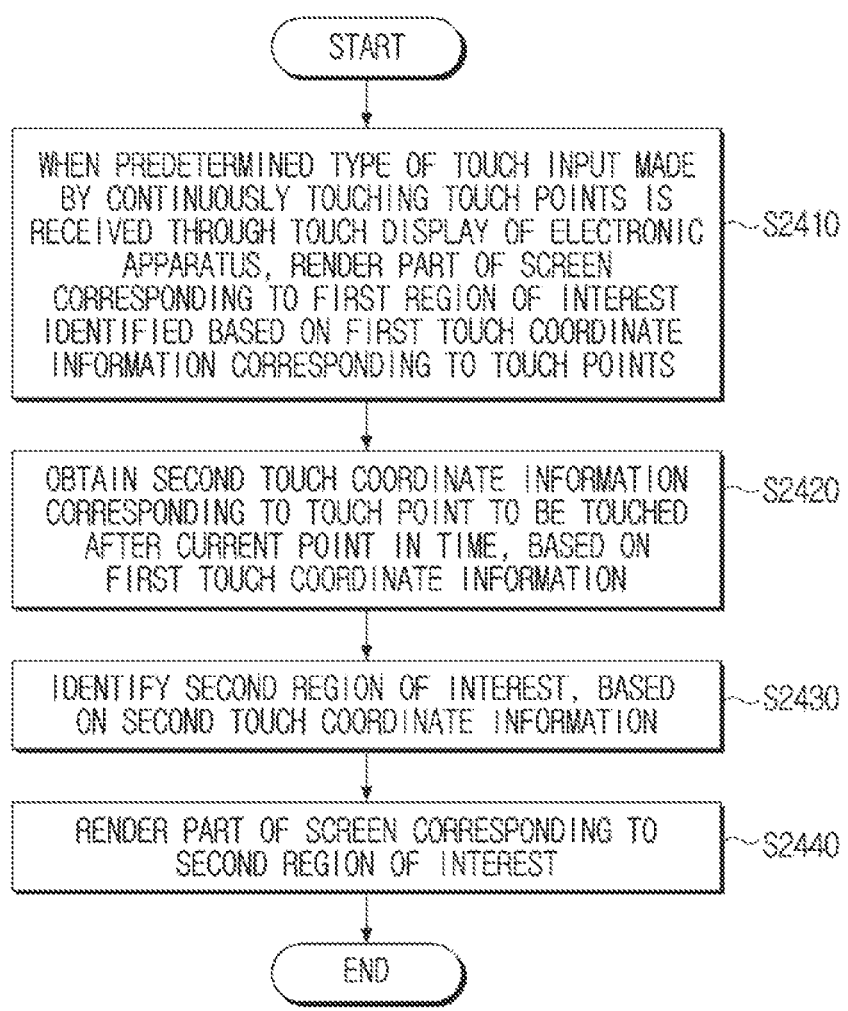
FIG. 24 is a flowchart of a control method of an electronic apparatus according to an embodiment of the disclosure.

FIG. 24 is a flowchart of a control method of an electronic apparatus according to an embodiment of the disclosure.

First, when a predetermined type of touch input made by continuously touching a plurality of touch points is received through a touch display of the electronic apparatus, a part of a screen corresponding to a first ROI identified based on first touch coordinate information corresponding to the plurality of touch points is rendered at operation S2410. Next, second touch coordinate information corresponding to a touch point to be touched after a current point in time is obtained on the basis of the first touch coordinate information at operation S2420. Next, a second ROI is identified based on the second touch coordinate information at operation S2430. Next, a part of the screen corresponding to the second ROI is rendered at operation S2440.

Here, the identifying of the second ROI at operation S2430 may include identifying the second ROI on the basis of the second touch coordinate information when the second touch coordinate information is outside the first ROI, and maintaining the first ROI when the second touch coordinate information is within the first ROI.

The obtaining of the second touch coordinate information at operation S2420 may include obtaining a speed and acceleration of a touch input on the basis of information about a touch point at a current point in time and information about a touch point obtained immediately before the current point in time, and obtaining the second touch coordinate information on the basis of the speed and acceleration.

Here, the obtaining of the second touch coordinate information at operation S2420 may include obtaining information about touch inputs for a predetermined time period before the current point in time among a plurality of touch points, obtaining a plurality of accelerations corresponding to the touch points on the basis of the information about the touch points, obtaining a speed at the current point in time on the basis of information about the touch point at the current point in time and the information about the touch point obtained immediately before the current point in time, and obtaining the second touch coordinate information on the basis of the speed and a largest acceleration among the plurality of accelerations, and the predetermined time period may be a sampling period of the screen displayed on the touch display.

When the electronic apparatus is in the first mode, the rendering of the part of the screen corresponding to the first ROI at operation S2410 may include rendering a screen corresponding to a basic ROI, changing the first mode to the second mode when a touch input is received, and rendering the part of the screen corresponding to the first ROI.

Here, when at least one of a shape, resolution, dots per inch (DPI), or layout of the touch display is changed while the electronic apparatus is in the first mode, the rendering of the part of the screen corresponding to the first ROI at operation S2410 may include updating the basic ROI and rendering a screen corresponding to the updated basic ROI.

The control method may further include controlling the touch display to display a screen including an object, the rendering of the part of the screen corresponding to the first ROI at operation S2410 may include rendering a part of a first ROI identified based on first touch coordinate information corresponding to a size of the object and a drag input for the object when the drag input is received through the touch display, and the identifying of the second ROI at operation S2430 may include identifying the second ROI on the basis of the size of the object and the second touch coordinate information.

In embodiments, the control method may further include controlling the touch display to display a screen including a video, the rendering of the part of the screen corresponding to the first ROI at operation S2410 may include rendering a part of the screen corresponding to a first ROI identified based on a position of the displayed video and the first touch coordinate information, and the identifying of the second ROI at operation S2430 may include identifying the second ROI on the basis of the position of the displayed video and the second touch coordinate information.

In embodiments, the rendering of the part of the screen corresponding to the first ROI at operation S2410 may include rendering a part of the screen corresponding to a first ROI identified based on first-first touch coordinate information corresponding to a predetermined type of first touch input and first-second touch coordinate information corresponding to a predetermined type of second touch input when the first touch input and the second touch input are received, the obtaining of the second touch coordinate information at operation S2420 may include obtaining second-first touch coordinate information corresponding to a touch input to be touched after a current point in time on the basis of the first-first touch coordinate information and obtaining second-second touch coordinate information corresponding to the touch input to be touched after the current point in time on the basis of the first-second touch coordinate information, and the identifying of the second ROI at operation S2430 may include identifying the second ROI on the basis of the second-first touch coordinate information and the second-second touch coordinate information.

In embodiments, the electronic apparatus may include a first processing unit that operates based on an operating system and a second processing unit that performs a predetermined operation, the rendering of the part of the screen corresponding to the first ROI at operation S2410 may include controlling the second processing unit to render the part of the screen corresponding to the first ROI by the first processing unit when a touch input is received through the touch display, the obtaining of the second touch coordinate information at operation S2420 may include obtaining the second touch coordinate information on the basis of the first touch coordinate information by the first processing unit, the identifying of the second ROI at operation S2430 may include identifying the second ROI on the basis of the second touch coordinate information by the first processing unit, and the rendering of the part of the screen corresponding to the second ROI at operation S2440 may include controlling the second processing unit to render the part of the screen corresponding to the second ROI by the first processing unit.

According to various embodiments of the disclosure as described above, an electronic apparatus may be capable of reducing work load by rendering only a region of a display rather than an entire region of the display, thereby reducing power consumption.

According to an embodiment of the disclosure, the various embodiments described above may be implemented as software including instructions stored in a machine-readable storage media that are readable by a machine (e.g., a computer). The machine is a device capable of calling an instruction stored in a storage medium and operating according to the called instruction and may include an electronic apparatus (e.g., an electronic device A) according to the embodiments set forth herein. When an instruction is executed by a processor, a function corresponding to the command may be executed directly by the processor or executed using other components under control of the processor. The instruction may include code generated or executable by a compiler or interpreter. The machine-readable storage media may be provided as non-transitory storage media. Here, the term "non-temporary" means that the storage medium does not include a signal and is tangible but does not indicate whether data is stored in the storage medium semi-permanently or temporarily.

In an embodiment of the disclosure, methods according to various embodiments of the disclosure as described above may be provided by being included in a computer program product. The computer program product may be traded as a product between a seller and a purchaser. The computer program product may be distributed in the form of a machine-readable storage medium (e.g., compact disc read-only memory (CD-ROM)) or may be distributed online through an application store (e.g., Play Store™). When distributed online, at least some of the computer program product may be temporarily stored or generated in a storage medium such as server of a manufacturer, a server of an application store, or a memory of a relay server.

Various embodiments of the disclosure as described above may be implemented in a recording medium readable by a computer or the like using software, hardware or a combination thereof. In some cases, the embodiments described herein may be implemented as a processor. According to software implementation, the embodiments of the procedures and functions described herein can be implemented as separate software modules. Each of the software modules may perform one or more of the functions and operations described herein.

Computer instructions for performing a processing operation of a machine according to the various embodiments described above may be stored in a non-transitory computer-readable medium. A processing operation of a machine according to the various embodiments described above is performed by a certain machine when the computer instructions stored in the non-transitory computer-readable medium are executed by a processor of the machine. The non-transitory computer-readable medium should be understood to mean a medium that stores data semi-permanently and that is readable by a machine rather than a medium, e.g., a register, a cache or a memory, that stores data for a short time. Examples of the non-transitory computer-readable medium may include a CD, a DVD, a hard disc, a Blu-ray disc, a USB, a memory card, and a ROM.

Each of the components (e.g., modules or programs) according to the various embodiments described above may include a single or multiple entities, and some of the sub-components described above may be omitted or other sub-components may be further included in various embodiments. Generally or additionally, some components (e.g., modules or programs) may be integrated into one entity that performs functions performed by the components in the same or similar way. According to various embodiments, operations may be performed by modules, programs or other components in a sequential, parallel, repetitive, or heuristic manner, at least some of the operations may be performed in a different order or omitted or other operations may be added.

Although embodiments of the disclosure have been illustrated and described herein, the disclosure is not limited thereto, and various modifications may be made by those of ordinary skill in the art without departing from the scope of the disclosure defined in the following claims and should not be understood separately from the technical idea or prospect of the disclosure.

What is claimed is:

1. An electronic apparatus comprising:
   a touch display;
   at least one processor connected to the touch display; and
   a memory storing instructions which, when executed by the at least one processor individually or collectively, cause the electronic apparatus to:
      based on a predetermined type of a touch input made by continuously touching a plurality of touch points being received through the touch display, render a part of a screen corresponding to a first region of interest which is identified based on first touch coordinate information corresponding to the plurality of touch points;
      obtain second touch coordinate information corresponding to a predicted upcoming touch point which is predicted to be touched after a current time, based on the first touch coordinate information and a plurality of accelerations corresponding to the touch input;
      identify a second region of interest based on the second touch coordinate information; and
      render a part of the screen corresponding to the second region of interest.

2. The electronic apparatus as claimed in claim 1, wherein the instructions, when executed by the at least one processor individually or collectively, further cause the at least one processor to:
   identify the second region of interest based on the second touch coordinate information being outside the first region of interest; and
   maintain the first region of interest based on the second touch coordinate information being within the first region of interest.

3. The electronic apparatus as claimed in claim 1, wherein the instructions, when executed by the at least one processor individually or collectively, further cause the at least one processor to:
   obtain a speed and acceleration corresponding to the touch input, based on information about a touch point detected at the current time and information about a touch point detected immediately before the current time; and
   obtain the second touch coordinate information, based on the speed and the acceleration.

4. The electronic apparatus as claimed in claim 3, wherein the instructions, when executed by the at least one processor individually or collectively, further cause the at least one processor to:
   obtain information about touch points detected during a predetermined time period before the current time among the plurality of touch points;
   obtain the plurality of accelerations based on the information about the touch points;
   obtain a speed corresponding to the current time, based on the information about the touch point at the current time and the information about the touch point detected immediately before the current time; and
   obtain the second touch coordinate information, based on the speed and a highest acceleration among the plurality of accelerations, and
   wherein the predetermined time period comprises a sampling period of the screen displayed on the touch display.

5. The electronic apparatus as claimed in claim 1, wherein the instructions, when executed by the at least one processor individually or collectively, further cause the at least one processor to:
   render the screen corresponding to a basic region of interest based on the electronic apparatus being in a first mode; and change the first mode to a second mode and render the part of the screen corresponding to the first region of interest, based on the touch input being received.

6. The electronic apparatus as claimed in claim 5, wherein the instructions, when executed by the at least one processor individually or collectively, further cause the at least one processor to:
update the basic region of interest based on at least one of a shape, resolution, dots per inch (DPI), or layout of the touch display being changed while the electronic apparatus is in the first mode, and
render a part of the screen corresponding to the updated basic region of interest.

7. The electronic apparatus as claimed in claim 1, wherein the instructions, when executed by the at least one processor individually or collectively, further cause the at least one processor to:
control the touch display to display the screen including an object;
based on a drag input for the object being received through the touch display, render the part of the screen corresponding to the first region of interest identified based on a size of the object and the first touch coordinate information corresponding to the drag input;
obtain the second touch coordinate information based on the first touch coordinate information;
identify the second region of interest based on the size of the object and the second touch coordinate information; and
render the part of the screen corresponding to the second region of interest.

8. The electronic apparatus as claimed in claim 1, wherein the instructions, when executed by the at least one processor individually or collectively, further cause the at least one processor to:
control the touch display to display the screen including a video;
render the part of the screen corresponding to the first region of interest identified based on a position of the displayed video and the first touch coordinate information, when the touch input is received;
obtain the second touch coordinate information based on the first touch coordinate information;
identify the second region of interest based on the position of the displayed video and the second touch coordinate information; and
render the part of the screen corresponding to the second region of interest.

9. The electronic apparatus as claimed in claim 1, wherein the instructions, when executed by the at least one processor individually or collectively, further cause the at least one processor to:
based on a first predetermined type of a first touch input and a second predetermined type of a second touch input being received, render the part of the screen corresponding to the first region of interest identified based on first-first touch coordinate information corresponding to the first touch input and first-second touch coordinate information corresponding to the second touch input;
obtain second-first touch coordinate information corresponding to the predicted upcoming touch point based on the first-first touch coordinate information, and obtain second-second touch coordinate information corresponding to the predicted upcoming touch point based on the first-second touch coordinate information;
identify the second region of interest based on the second-first touch coordinate information and the second-second touch coordinate information; and
render the part of the screen corresponding to the second region of interest.

10. The electronic apparatus as claimed in claim 1, wherein the at least one processor comprises:
a first processing unit configured to operate based on an operating system; and
a second processing unit configured to perform a predetermined operation, and
wherein the first processing unit is further configured to:
control the second processing unit to render the part of the screen corresponding to the first region of interest based on the touch input being received through the touch display;
obtain the second touch coordinate information based on the first touch coordinate information;
identify the second region of interest based on the second touch coordinate information; and
control the second processing unit to render the part of the screen corresponding to the second region of interest.

11. The electronic apparatus of claim 1, wherein the instructions, when executed by the at least one processor individually or collectively, further cause the electronic apparatus to:
obtain a speed and acceleration corresponding to the touch input;
obtain the plurality of accelerations based on touch points detected during a sampling period of the screen, from among the plurality of touch points; and
obtain the second touch coordinate information based on the first touch coordinate information, the speed, and a highest acceleration among the plurality of accelerations.

12. The electronic apparatus of claim 1, wherein the second touch coordinate information is obtained based on a highest acceleration from among the plurality of accelerations.

13. A control method of an electronic apparatus, the control method comprising:
based on a predetermined type of a touch input made by continuously touching a plurality of touch points being received through a touch display of the electronic apparatus, rendering a part of a screen corresponding to a first region of interest which is identified based on first touch coordinate information corresponding to the plurality of touch points;
obtaining second touch coordinate information corresponding to a predicted upcoming touch point which is predicted to be touched after a current time, based on the first touch coordinate information and a plurality of accelerations corresponding to the touch input;
identifying a second region of interest based on the second touch coordinate information; and
rendering a part of the screen corresponding to the second region of interest.

14. The control method as claimed in claim 13, wherein the identifying of the second region of interest comprises:
identifying the second region of interest based on the second touch coordinate information being outside the first region of interest; and
maintaining the first region of interest based on the second touch coordinate information being within the first region of interest.

15. The control method as claimed in claim 13, wherein the obtaining of the second touch coordinate information comprises:

obtaining a speed and acceleration corresponding to the touch input, based on information about a touch point detected at the current time and information about a touch point detected immediately before the current time; and obtaining the second touch coordinate information, based on the speed and the acceleration.

16. The control method as claimed in claim 15, wherein the obtaining of the speed and the acceleration of the touch input comprises:

obtaining information about touch points detected during a predetermined time period before the current time among the plurality of touch points;

obtaining the plurality of accelerations based on the information about the touch points;

obtaining a speed corresponding to the current time, based on the information about the touch point at the current time and the information about the touch point detected immediately before the current time; and obtaining the second touch coordinate information, based on the speed and a highest acceleration among the plurality of accelerations, and wherein the predetermined time period comprises a sampling period of the screen displayed on the touch display.

17. The control method as claimed in claim 13, wherein the rendering of the part of the screen corresponding to the first region of interest comprises:

rendering the screen corresponding to a basic region of interest based on the electronic apparatus being in a first mode; and changing the first mode to a second mode and rendering the part of the screen corresponding to the first region of interest, based on the touch input being received.

* * * * *